(12) United States Patent
Wilkins et al.

(10) Patent No.: US 10,075,016 B2
(45) Date of Patent: Sep. 11, 2018

(54) WAVEFORM DISTORTION MITIGATION IN POWER SYSTEMS

(76) Inventors: Thomas Alexander Wilkins, Henderson, NV (US); Mark E. Haller, River Falls, WI (US); Charles Grunewald, Ottertail, MN (US)

(*) Notice: Subject to any disclaimer, the term of this patent is extended or adjusted under 35 U.S.C. 154(b) by 1114 days.

(21) Appl. No.: 13/475,424

(22) Filed: May 18, 2012

(65) Prior Publication Data
US 2013/0038123 A1    Feb. 14, 2013

Related U.S. Application Data

(60) Provisional application No. 61/488,264, filed on May 20, 2011.

(51) Int. Cl.
| | | |
|---|---|---|
| *H02J 4/00* | (2006.01) | |
| *H02J 13/00* | (2006.01) | |
| *H02J 3/01* | (2006.01) | |
| *H02J 3/18* | (2006.01) | |

(52) U.S. Cl.
CPC .......... *H02J 13/0079* (2013.01); *H02J 3/01* (2013.01); *H02J 3/18* (2013.01); *Y02E 40/30* (2013.01); *Y02E 40/40* (2013.01); *Y02E 40/74* (2013.01); *Y04S 10/22* (2013.01); *Y10T 307/305* (2015.04)

(58) Field of Classification Search
CPC . H02J 13/0079; H02J 3/18; H02J 3/01; Y10T 307/305; Y02E 40/74; Y02E 40/30; Y02E 40/40; Y04S 10/22
See application file for complete search history.

(56) References Cited

U.S. PATENT DOCUMENTS

| | | | | |
|---|---|---|---|---|
| 5,051,685 A | * | 9/1991 | Sink | H02J 3/01 323/208 |
| 5,798,631 A | | 8/1998 | Spée et al. | 322/25 |
| 5,883,796 A | * | 3/1999 | Cheng | H02J 3/1814 307/105 |
| 6,510,063 B2 | | 1/2003 | Kobayashi et al. | 363/41 |
| 6,850,100 B2 | * | 2/2005 | Takeshita | H03K 17/166 327/112 |
| 7,847,527 B2 | * | 12/2010 | Berggren | H02J 3/06 323/216 |

(Continued)

OTHER PUBLICATIONS

Institute of Electrical and Electronics Engineers, Inc. (IEEE), "IEEE Recommended Practices and Requirements for Harmonic Control in Electrical Power Systems," *IEEE Std* 519-1992, 101 pages (Apr. 1993).

(Continued)

*Primary Examiner* — Michael C Zarroli

(57) ABSTRACT

Systems and methods for governing a signal waveform of a signal flowing through a component of a power transmission system that includes a plurality of switch-mode power processors and may be a polyphase system. At least one of current and voltage is integrally monitored at each of a plurality of locations on the power system and is characterized relative to specified constraints. When a monitored voltage or current is outside of the specified constraints, the voltage or current is modified by changing at least one of the time delay or phase characteristics of at least one of the source, load and transmission elements on the power transmission system.

17 Claims, 14 Drawing Sheets

(56) References Cited

U.S. PATENT DOCUMENTS

| | | | |
|---|---|---|---|
| 8,179,250 B2* | 5/2012 | Yang | H02M 5/2573 |
| | | | 307/126 |
| 2012/0104850 A1* | 5/2012 | Fallis | H02J 3/1864 |
| | | | 307/31 |
| 2012/0173174 A1* | 7/2012 | Gaarder | G01R 31/086 |
| | | | 702/58 |

OTHER PUBLICATIONS

Parthemore et al., "Gassing in wind-farm transformers," *Windpower Engineering & Development*, 4 pages, www.windpowerengineering.com, (Apr. 2012).

* cited by examiner

WAVEFORM DISTORTION MITIGATION IN POWER SYSTEMS

The present application claims priority from U.S. Provisional patent Application Ser. No. 61/488,264, filed May 20, 2011, and incorporated herein by reference.

A portion of the disclosure of this patent document contains material which is subject to copyright protection, and the present notice is provided in accordance with 37 CFR 1.71(e). The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention pertains to devices and methods for modifying waveform content in power systems, and, more particularly, to devices and methods for modifying waveform distortion in polyphase AC and DC power equipment.

BACKGROUND OF THE INVENTION

Deployment of distributed power generation such as wind and solar power continues to grow. Most of these power systems rely on numerous switched-mode power processors (SMPPs) which facilitate connection of a power station to a power system grid. SMPPs are fully described in Mohan, et al., *Power Electronics: Converters, Applications, and Design*, (3d ed., 2002; hereinafter, "Mohan (2002)," which is incorporated herein by reference. SMPPs can produce undesirable harmonic distortion into the power system. The standard for power system harmonic content is guided by IEEE 519 1992 (hereinafter, "IEEE 519"), which for example, considers a single point of interconnection as the measuring point for signal distortion on the power system. More importantly, IEEE 519 primarily evaluates signal distortion as harmonic multiples only of the fundamental frequency on AC power systems. But, more importantly, IEEE 519 admits that "the effects of harmonics on electric equipment, appliances, etc., are not fully understood," and goes on to recommend a probabilistic method of evaluating harmonic distortion, such that if limits are only exceeded for a short period of time, the condition could be considered acceptable. Despite adherence to the aforesaid standard, there is evidence that multiple SMPPs can collectively construct undesirable and potentially damaging harmonic distortion that may compromise the integrity of the power grid.

Various methods have been employed for reduction of harmonic content on polyphase power systems, however all of them are limited in that they eliminate only a particular class of harmonics (namely, integral multiples of the AC fundamental), and in that each is capable of being applied only at a single node of a power system. For example, U.S. Pat. No. 6,510,063, incorporated herein by reference, teaches the use of pulse wide modulation (PWM) for elimination of harmonics, but only at a given node at the interconnection of the power conversion unit.

The fact that the prior art applies harmonic mitigation only at a local, single point, is a particularly egregious limitation in the case of wind power. U.S. Pat. No. 5,798,631, for example, incorporated herein by reference, teaches a variable-speed, constant-frequency (VSCF) system utilizing a doubly fed induction machine to provide for harmonics and reactive compensation. Control of harmonic content in the '631 patent, however, is provided at the mains of a wind turbine generator or, more specifically, at a converter interfacing between the generator and an output to the grid. The '631 Patent, however, leaves open the questions: How is the signal to be modified at a remote location, and how can signal quality be improved at the remote location when many SMPPs or converters feed into the system?

Similarly, while it already known how to determine the impact of non-linear load harmonics on voltage distortion at a point of common coupling, such techniques are limited to singular points within a system, and do not characterize the system in its entirety. Thus, for example, dynamic harmonic filters are known in the context of AC power systems, however they only monitor, and improve performance at, specific single points on the system.

Currently practiced techniques are prone to damage both utility and customer equipment, as suggested, in the context of transformers in Parthemore, et al., "Gassing in Wind-Farm Transformers," *Windpower Eng. & Dev.*, pp. 49-51, (April, 2012), incorporated herein by reference. It would be extremely advantageous for a method to provided that would cancel, or attenuate, undesirable signals before their passage through a susceptible component of a power transmission system and before extensive damage is done.

Currently, waveform distortion causes premature aging of electrical equipment, excessive heating, current and voltage stresses that cause failure in electrical components, loss of real power production and consequently loss of revenue. On polyphase AC power systems and DC power systems, distortion of the desired signal has consequences. In the past, power systems engineers called this "harmonic distortion." The problem is larger however, and encompasses all manner of signal distortion.

When new power plants or new components are placed onto a power system, a harmonic study is required to discover or predict harmonic issues in the power system that operators and owners may find unacceptable. A plant developer may sometimes be required to provide a harmonic study for the electrical distribution system. The intent of such a harmonic study is to confirm that the specified and supplied equipment will operate properly when installed as specified in the system and will not adversely impact the operation of other equipment.

Currently, harmonic studies include various portions of the electrical distribution system, from the normal and alternate sources of power down to each load shown on the "one-line diagram" used to depict the system. However, some power system elements within the power system are summarized and not delineated as well as others. The concept of using harmonics is applied not only to operation during normal conditions, but also to alternate operational configurations, emergency power conditions and any other operations which could result in harmonic distortion exceeding prescribed standards.

In accordance with prior art practice, harmonic analysis is typically performed with a simulation which is a series of harmonic calculations, and discusses some of the results at the following locations:
 1. The point of common coupling
 2. Primary side of each unit substation (normal power)
 3. The bus of each switchboard (normal and alternate power)
 4. Each alternate power source (including generators)
 5. The collector system busses within the a distributed generation system
 6. Various Loads within the power system The resultant harmonic analysis includes recommendations for mitigating the total harmonic voltage distortion or total current demand distortion on the system if the combination of loads exceeds or violates the limits of various standards. Also, the analysis includes recommendations for mitigating the impact of the harmonic distortion on plant equipment or processes if the levels are such that equipment or processes may be impaired.

However, harmonic analysis is deficient in modern power systems and, even though switch mode power supplies and other modern piecewise or nonlinear elements are mentioned in IEEE 519, the standard is brief and insufficient on characterizing their behavior on the power system. These newer topologies, such as switch mode power processors, produce distortion that is not a whole number multiple of the fundamental frequency on the power system Another deficiency in the current state of the art and existing processes is that, typically, signal distortion is handled only in the planning phases of a power system that is to be modified or a new power system. For example, if a new power plant is to be installed, the harmonic study would be performed to assess it impact on the power system with respect to power quality. This process uses models of the power system to predict what the harmonic impact will be and does not assess the actual or measured impact. However, some plants are required to measure and validate their models after the plant or device is installed.

Yet another deficiency in the state of the art of harmonic distortion is that harmonic distortion is predicated on whole number multiples of the fundamental frequency on the power system. This infers that the cause of signal distortion has a single mode or cause, and lumps signal distortion into one elemental category and does not break out all the causes of distortion on the power system. However, new switch mode power supplies placed either on the load or the sources do not always distort the signal at a whole number multiple of the fundamental frequency. Consequently, current state of the art of harmonic analysis is incomplete when attempting to consider all the causes of signal distortion.

For example, in the ideal case for three phase power systems, including wind turbines and wind parks, all the waveforms would be considered sinusoidal with no distortion occurring at a fundamental frequency such as 60 Hz in the Americas and 50 Hz in Europe and elsewhere. This includes the waveforms of all currents and voltages. However, in reality this is not the case. The waveforms are distorted. Most electrical equipment will create distortion in the waveforms. The signal distortion can be problematic because it may damage, age, or reduce efficiency of equipment within the power system. In the past, before switch mode power processors became popular to use on the power system, engineers knew what type of signal distortion was going to occur and utilized tried and true methods to remedy problems that may arise. However with new distributed generation power plants such as wind farms, which use switch mode power processors, plant operators have found old methods do not work as well as they did in the past. For example, the introduction of large scale wind generation on the North American and European power systems which use large scale switch mode power processors (of greater than 100 kW) signal distortion is observed on power systems, and the signal distortion is not a whole number multiple of the fundamental (e.g., 50 Hz, 60 Hz).

Generally, signal distortion is represented in the frequency domain by breaking down the time based signal in to a frequency-based equivalent at frequencies that are based upon whole-number multiples of the fundamental. Such representation may be referred to as harmonic analysis. The output of this analysis creates a bar graph spaced equally showing magnitudes of the signal amplitudes at multiples of the fundamental. Each bar is called a harmonic of the fundamental. For example, if the bar is the 11th bar in the graph and the fundamental is 60 Hz, this bar would represent the 11th harmonic at given amplitude, its frequency being 11 multiplied by 60 Hz, or 660 Hz.

For example, in order for a power processor to create or synthesize a signal on the power system at the fundamental frequency such as 60 Hz, it uses techniques, including but not limited to, pulse width modulation (PWM), techniques, and rotational transformations, to approximate the desired current and/or voltage waveforms at its terminals. However, in order to create these desired waveforms, the algorithms and PWM switching equipment will take an ideal waveform signal and distort it. Furthermore, PWM switching equipment and algorithm will replicate an already distorted waveform on the power system. The spectrum of the distortion including the phase and magnitude vary as the frequency increases. It has been observed that the magnitude of the distortion decreases as the frequency increases, but this is not always the case. In distributed generation and in distributed loads which use switch mode power supplies or power processors the distortion can add up at common location on the power system and the resulting distortion at higher frequencies may become unacceptable.

To cite one example of waveform distortion, modern wind turbines use switch mode power processors (SMPPs) to improve performance and control torque. SMPPs, in broad terms, attempt to process and control the power by supplying either/or voltages and currents in a form that best suits requirements. However SMPPs can only approximate the ideal wave form for the load, often by replicating a template wave-form sampled from the grid to which it is connected. Consequently, these imperfect wave forms created by SMPPs contribute to the overall distortion. Also, SMPPs are designed from the view point of supplying loads on an individual basis; with the exception of SMPPs independently interfering with each other in the hopes of creating less distortion. Presently, the signal distortion caused can be characterized on an individual basis but not controlled on an aggregate basis at the point of common coupling or within the entire power system. Furthermore, standards used for testing of power system quality rely on the test of a single node, where single or multiple devices such as SMPPs, perhaps hundreds, will comprise a single power plant, such as in a wind powered plant.

Currently, SMPPs are not coordinated with each other to minimize harmonic content and or signal distortion. Typically, they operate individually without coordinating with each other or any other power system component. However, on an individual basis they attempt to minimize their harmonic content. Generally, manufactures publish that their SMPP meet acceptable standards such as IEEE 519. Ironically, some manufactures would argue that the aggregate harmonic content for several SMPPs is less since they would interfere with each other. However, the converse is equally true since they are not coordinated and may constructively increase the level of distortion. It has been observed that the harmonic content or signal distortion would cyclically increase at different times and various amplitudes on the power system. It has also been observed in areas where there is large distributed generation. Basically, the level of harmonic content at a specific point within the power system is random and may or may not exceed acceptable standards. Currently, there exists no mechanism to know when or where the distortion may add up beyond acceptable standards since there are no standard measurements analyses that would capture these phenomena in their entirety.

As another example, before the popular implementation of power semiconductors, the main sources of waveform distortion were electrical arc furnaces, the accumulated effect of fluorescent lamps, and to a lesser extent electrical machines and transformers. The increasing use of power electronic devices in the wind turbine industry for the control of power apparatus and systems has been the reason for the greater concern about waveform distortion and its effect on wind turbines and related power system components in recent times.

A SMPP can be viewed as a matrix of static switches that provides a flexible interconnection between input and output nodes of the electrical power system of a wind turbine generator, or more generally, electrical equipment on the power system For example, through these switches, power can be bidirectionally transferred to the generator of the wind turbine. Because of their considerable power ratings, three-phase SMPPs may be the main contributors to the distortion problem. For clarification, the SMPP can perform both functions of rectification and inversion and are used for powers transfers from AC to DC or DC to AC, respectively, and the term "conversion" may be used when the power electronic device has bi-directional power transfer capability. According to the relative position of the firing instant of the switches, whether cycle to cycle or subcycle, four different power electronic control principles are in common use: (1) Constant phase-angle control produces consecutive switch firings equally spaced with reference to the irrespective commutating voltages. (2) Equidistant firing control produces consecutive firings at equal intervals of the supply frequency. (3) Modulated phase-angle control produces time-varying phase-modulated firings. (4) Integral cycle control selects an integer number of complete cycles or half cycles of the supply frequency. And one additional and uncommon use is flux-path switching, where the flux path is switched and modulated through coils.

Signal distortion and harmonics on the power system can damage wind turbine generators in a multitude of ways. As one example, the problem of over voltage saturation is particularly damaging to transformers and wind turbine generators. In the case of transformers connected to a converter following load rejection and depending how far out on a radial collector circuit the WTG is located, it has been shown that the voltage at the converter terminals can exceed 1.43 per unit, thus driving the converter transformer deep into saturation. The symmetrical magnetizing current associated with wind turbine transformer core saturation contains odd harmonics. If the fundamental component is ignored, and if it is assumed that all triple harmonics are absorbed in delta windings, then the harmonics being generated are of orders 5, 7, 11, 13, 17, 19 . . . , i.e., those of orders 6k±1, where k is an integer. When considering a wind turbine with a wound rotor generator it easy to show how the stator generator terminals experience this. An important note is that for a doubly-fed wound rotor generator (DFIG), the power flow is bi-directional depending on the rotor RPM. For the induction generator the fifth and seventh harmonic combine to produce a pulsation or hammer torque that can damage the wind turbine drive train. Other higher order harmonics that combine in a similar nature will also produce damage to the drive train.

The current state of harmonic analysis considers the harmonics at a particular point or line at a particular time or possibly a series of snapshots such as the point of common coupling (PCC). The issue with this is that the picture is static and not fluid. The existing methods of analyses do not include traveling waves on the power system; nor do they consider the signal propagation delays through plants and controllers. One salient limitation of contemporary harmonic analysis is that it does not consider traveling waves and signal propagation delay(s) within the control system or distributed control system. A distributed control system is made up of many controls working separately or together or some combination of the two within the wind plant or park. One problem resulting from this is that an engineer does not have an idea of what is causing the harmonic or, better stated, signal distortion, since we know harmonic analysis is limited in the first place, and unless it is a usual cause that can be easily identified, the engineer is unable to arrive at a determinate solution.

An analogy to rogue waves on the ocean are waves that usually occur as one gigantic wave passing a given point. For power systems with SMPPs traveling waves are not usually a concern, however wind plants or, more generally, distributed generation with large SMPPs are new and this phenomena is only now being revealed. Most likely it will show up on other power systems with large switch mode power supplies as well. For higher order harmonics above the 25th and especially beyond the 50th, these waves can propagate on the collector and local transmission and distribution (T&D) systems. Sometimes they add up to increase in amplitude and create an impulse on the power system that can be damaging to equipment. Currently, SMPP controllers are not coordinated to handle this issue.

Another type of rogue wave is an indirect one that is caused in part by the control system as well as by the power system. The control system issues a response and that response flows out on the power system. From there another controller sees the response and creates its own response sending it out on the power system. Several controllers can interact like this, sympathetically and in phase. Each controller on its own will have low signal distortion, however, since they are in phase at a particular node, a signal distortion may increase or be compounded. The aggregate effect is that the magnitude of a given frequency has increased and is damaging equipment. However, the aligning of the distributed control systems is transitory in nature and constructively aligns or destructively interferes, thus hiding itself from engineers and technicians, and reoccurring when conditions enable rogue wave construction.

For example, on large wind plants and within the power system in general, these waves start with the flow of charge, called current, and/or accelerated flow of charge (di/dt) on the power system at the wind plant. The distortion of the current waveform coupled with the impedance produces voltage harmonics. This signal distortion of the voltage is added to the existing distortion on the transmission system. Both combine to create the signal observed on the power system. Due to the complex nature of the power system, collector system, and distributed generator (DG) controls, it is difficult to identify how and when the distortion problems will construct or occur. What is needed are devices that allow engineers and technicians to change the system characteristics as needed to prevent power system signal distortion/harmonics from damaging equipment.

Because of the deficiencies in existing technology, some of which have been enumerated and described above, it is desirable to improve efficiency, power transfer reliability, and longevity of equipment, and to those ends the invention described below is directed.

SUMMARY OF THE INVENTION

In accordance with embodiments of the present invention, methods are provided for governing harmonic content of a signal flowing through a component of a power transmission system. These methods have steps that include:
- a. integrally monitoring at least one of current and voltage at a plurality of locations on the power transmission system;
- b. characterizing the integrally monitored at least one of voltage and current relative to specified constraints;
- c. when at least one of the voltage and current is outside of specified constraints at one of the plurality of locations, modifying each of the voltage and current by changing at least one of time delay or phase characteristics of at least one of source, load, and transmission elements on, or coupled to, the power transmission system.

In accordance with further embodiments of the invention, the power system may be either a polyphase AC power transmission system, or a DC power transmission system.

Methods in accordance with other embodiments of the invention may, further, identify a node within the power transmission system for applying a solution mitigating an identified waveform distortion, such as where the identified waveform distortion is manifested as a rogue wave. Modification of the voltage and current may include applying a solution at an identified node by governing a switch mode power processor (SMPP).

In accordance with yet further embodiments of the invention, the step of modifying may include shifting a phase of a specific impulse provided to the power transmission system by a specified source at an identified node. More particularly, the phase may be shifted by advancing or retarding the phase of a specified impulse provided to the power transmission system.

A method in accordance with claim 6, wherein applying the solution at the identified node includes applying a phase adjustment by means of at least one of a phase-adjustable current transformer and a phase-adjustable potential transformer.

A method in accordance with claim 7, wherein shifting the phase of a specified impulse includes creating one of constructive and destructive interference of signal distortion by means of partial phase delay mitigation.

A method in accordance with claim 7, wherein shifting the phase of a specified impulse includes applying phase-limiting control of a current transformer and a potential transformer within a switching period of an SMPP.

A method in accordance with claim 7, wherein shifting the phase of a specified impulse includes applying phase-limiting control of at least one of a current transformer and a potential transformer based, at least in part, on a duration of a period of an observed reflected wave.

A method in accordance with claim 7, wherein shifting the phase of a specified impulse includes adjusting an in-line controllable power delay line between the power system and an SMPP.

A method in accordance with claim 7, wherein shifting the phase of a specified impulse includes adjusting an in-line controllable power delay line between the power transmission system and a wind turbine generator.

A method in accordance with claim 7, wherein shifting the phase of a specified impulse includes adjusting a variable impedance.

A method in accordance with claim 7, wherein shifting the phase of a specified impulse includes digitally delaying a current or a voltage signal in an SMPP on the basis of a switching period.

In an alternate set of embodiments of the present invention, a system for governing harmonic content of a component of a power transmission system is provided. The system has a plurality of meters, at least one of which is disposed at a second monitored node of the power system distinct from a first monitored node of the power transmission system. Each meter generates a measure of waveform distortion. The system also has a database for storing the measures of waveform distortion, and a processor for centrally identifying a node where a solution reducing waveform distortion may be applied, based on the measures in the aggregate. Additionally, the system has a processor (possibly corresponding to the former processor) for centrally computing a solution for reducing the waveform distortion. Finally, the system has a waveform adjustor for applying the solution at the identified node, at least.

In various other embodiments of the invention, the waveform adjustor may be of a type adapted for advancing or retarding a feature of a waveform. The waveform adjustor may introduce a time delay in propagation of a signal within the power transmission system. It may include one or more of an SMPP, a phase-adjustable CT, a phase-adjustable PT, or an in-line controllable power delay line disposed between the power system and at least one of an SMPP and a wind turbine. The waveform adjustor may include a phase-adjusting CT, a phase-adjusting PT, or an additional processor for monitoring signal distortion and for adjusting a phase of at least one SMPP.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS OF THE INVENTION

Figure 1:
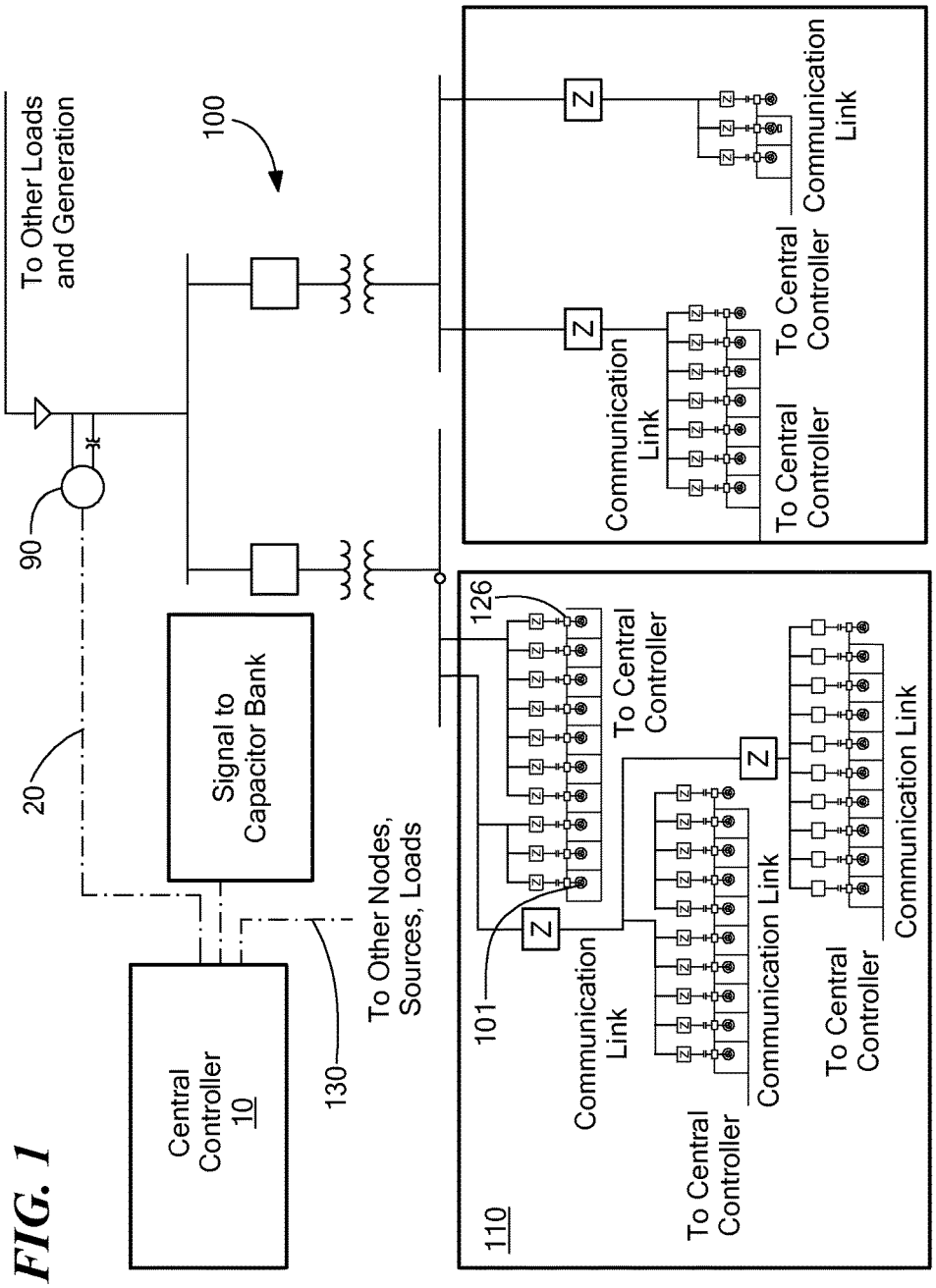
FIG. 1 is a flowchart illustrating a sub-operation of the present invention. Single line of a Power System with distributed Generation and Load. The controller, in accordance with embodiments of the present invention, identifies distortion and uses either the same or a separate device to mitigate the adverse effects of the distortion.
Figure 2:
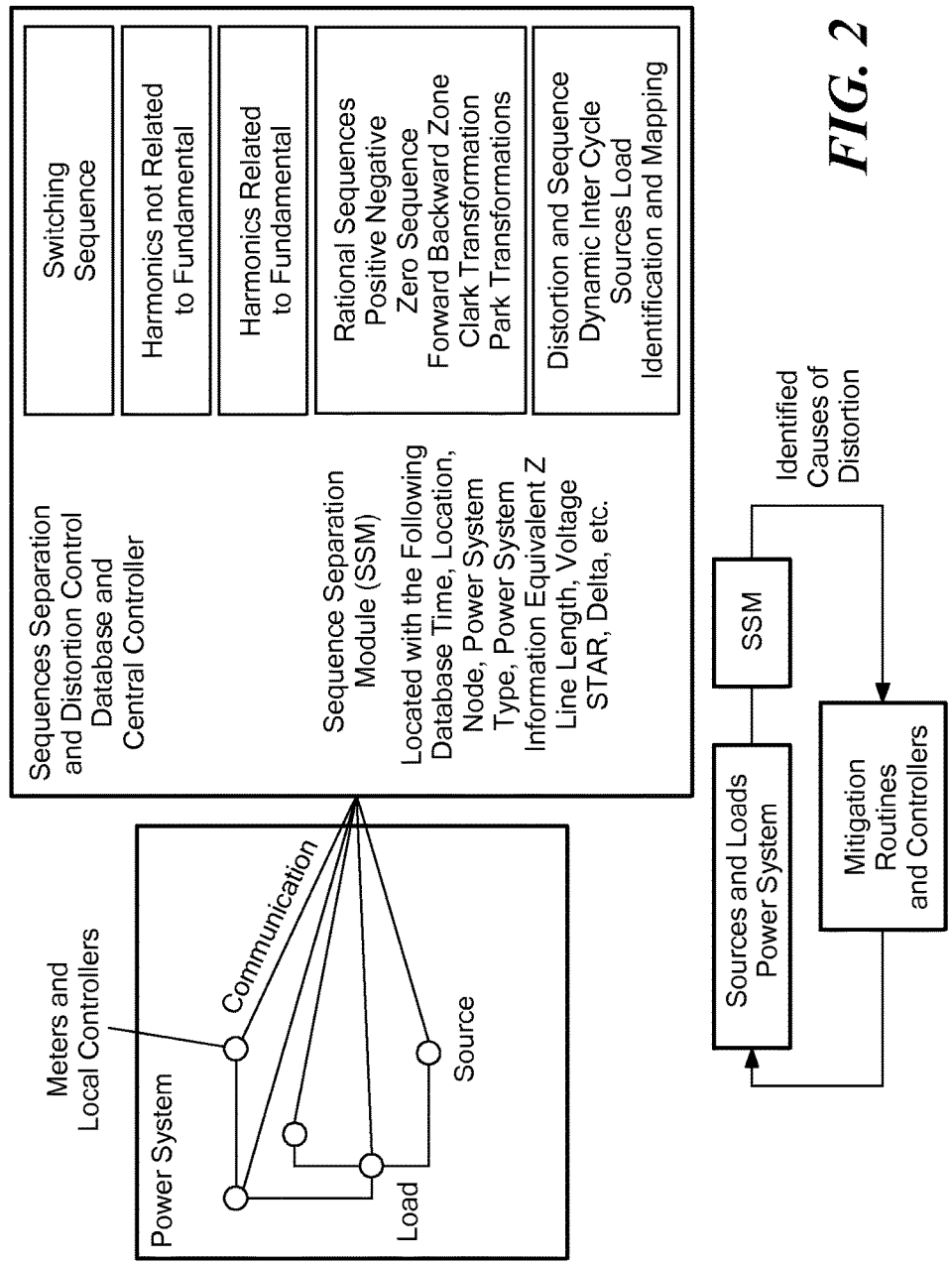
FIG. 2 is a block diagram depicting an overview of one embodiment of the present invention.

Embodiments of the present invention described herein relate generally to improving power system conditions and, more specifically, to a characterization of harmonics and underlying causes for improvement of a waveform on a power system in order to reduce distortion of waveforms on polyphase AC and DC power systems. Embodiments of the present invention may be employed advantageously to improve system efficiency, power transfer reliability, and longevity of equipment, as well as to prevent premature aging or damage to electrical equipment that is part of a power system or that is coupled to the power system.

Embodiments in accordance with the present invention, as described in detail below, provide real time and archived characterization of the power system and the characterization of signal distortion by defining sources and loads at the frequency at which they occur and not characterizing a source as just as source but defining where the source is acting at as load at a given frequency. Conversely, characterization of the load is performed in the similar manner by identifying where or what frequency it exists as a load, as well as where it exists as a source. Embodiments of the present invention then delineate where and when the sources and loads are and how they change depending on the existing state of the power system. This provides the opportunity for operators to place devices on the power system which can monitor the source and loads with respect to frequency and make changes as necessary to improve signal distortion and power quality.

As discussed above in the Background section, harmonic analysis performed in accordance with the prior art is inadequate. Waveform analysis is expanded, in accordance with embodiments of the present invention, to include all forms of signal distortion. Absent implementation of embodiments of the present invention, the emerging "smart grid" power system will become progressively vulnerable.

Definitions

As used herein and in any claims attached hereto, the term "waveform distortion," unless otherwise required by context, shall mean a deviation from a sinusoidal waveform.

"Harmonics," as used herein, are not limited to harmonics of the fundamental of an AC power system, but may also encompass, for example, harmonics of switching frequencies of switching converters, or harmonics of other elements that introduce distortion into the system.

A "power transmission system," as the term is used herein and in any claims attached hereto, shall mean any system for the coupling of electrical power from one or more sources of power to one or more loads. A power transmission system may include the source or sources, and one or more loads, but is not required to, within the scope of the present invention.

As used herein and in any claims attached hereto, the term "switch mode power processor" ("SMPP"), unless otherwise required by context, shall mean any power supply to either a generator or load that incorporates a switching regulator to convert power generated by a source into a synthesized waveform to be delivered to a load, wherein the switching may be externally governed in a specified way. In typical power distribution systems, switching occurs at frequencies between 1 kHz and 10 kHz, however, the invention is not limited to that typical range of operation.

As used herein and in any claims attached hereto, the term "collector system," unless otherwise required by context, shall refer to any system that collects energy from discrete power-generating elements, such as wind turbines, for example, and delivers the aggregate power to a collector substation, and, from there, to a transmission grid.

As used herein and in any claims attached hereto, the term "distributed generation," unless otherwise required by context, shall refer to any system whereby independent power generation units are connected to the power distribution system and are not part of a collective single entity power station.

The term "integrally monitor," unless otherwise required by context, shall refer performing substantially contemporaneous and self-consistent measurements at distinct locations within a system and to referring such measurements to one or more central processors.

The term "partial phase delay mitigation" refers to the attenuation of a distortion of a waveform by shifting a phase of a wave within an associated system.

A "waveform adjustor" is any circuit element, including analog or digital elements, serving to advance or retard a feature of a waveform, including the phase, if the waveform is periodic, or serving to introduce a propagation delay into a leg of a power system. Within the scope of the invention, propagation delay may be introduced by variable impedances, susceptabilities, etc.

Overview

Not only power processors or switch mode power supplies distort the signal on a polyphase power system. Transformers and other devices may, and do, distort the signal as well. Each power system device creates its own type of distortion and is impacted by distortion in its own way. In accordance with embodiments of the present invention described, now, in detail, two items that may be addressed include: What is the impact on the equipment of a particular waveform? And, how is the equipment distorting the signal? For example, a transformer that is going into saturation will distort the voltage and current waveforms on the secondary. Furthermore and depending on system strength, the current on the primary will be distorted as well; the transformer being the primary cause of the distortion. Also, other components being subjected to the distortion may contribute to the degradation of signal quality by creating additional or compounding signal distortion. If the transformer was not in saturation all of the problems may cease. The point is that when considering the cause(s) of signal distortion, each contributor should be considered and characterized so that the costliest or otherwise most critical contributor is remedied first, in accordance with the teachings now provided.

Embodiments of the present invention measure waveform distortion at many points. If current injection or voltage modification is needed, embodiments of the present invention, employing algorithms laid out below in detail, advantageously control the signal distortion by way of closed loop control, where the inputs of the controller are derived from several simultaneous points on the power system. In particular, the description now provided sets out how polyphase machines are controlled by SMPPS on the poly phase power system.

Figure 13:
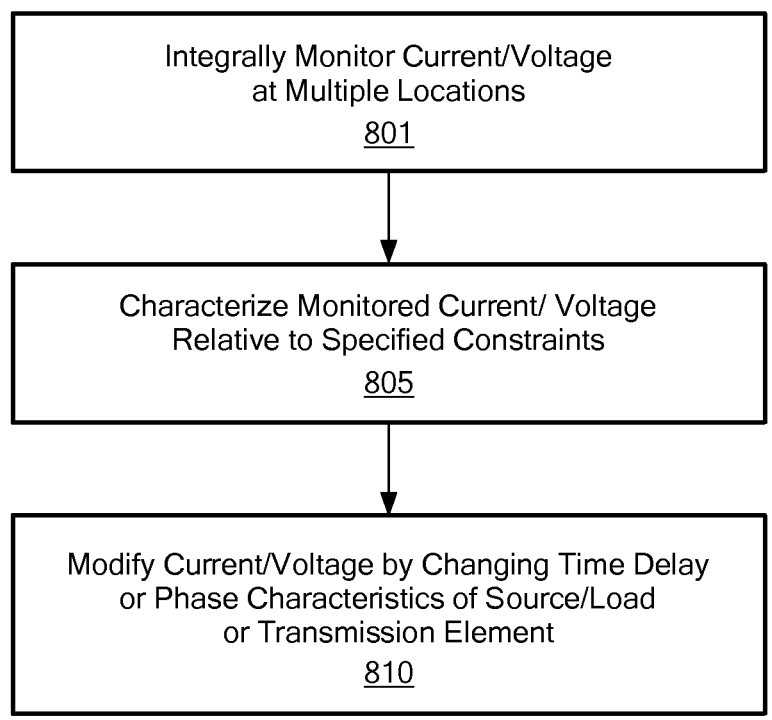
FIG. 13 is a further flowchart illustrating processes entailed in operation in relation to the power system in accordance with embodiments of the present invention.

Embodiments of the present invention are now described in detail, with reference to the drawings in which similar reference characters denote similar elements throughout the several views. Referring first to FIG. 13, current and/or voltage are monitored (801) at a plurality of locations on a power transmission system by a set of meters. This provides for characterizing (805) the monitored current or voltage relative to specified constraints such as voltage, current, or power limits. The current and voltage is then modified (810) insofar as they exceed the specified constraints, using one or more of stratagems of phase modification or time delay laid out in detail in the following description.

Further figures, described hereinafter, illustrate a central controller 10 (shown in FIG. 14, for example) for logging, measuring, and storing data and running algorithms to attempt to improve power quality and reduce or change signal or wave-form distortion. The data is stored in a database 60 where algorithms identify various potential causes of distortion through the processing of data 20 sent to the central controller from the monitored point 80. At each monitored point, the data originates from measuring devices or meters 90 (hereinafter, meters) connected to the power system 100. The meter sends back data that indicate the state of each frequency dependent source which are called net source intermittent loads (120) (shown in FIG. 4) and frequency dependent load which are called net load intermittent sources, and is a method of characterizing, both in the frequency and time domains, the power as a function of frequency and when, in time, it is occurring. The central controller uses the data along with specific algorithms, described below, to compute solutions to attempt to improve power quality and reduce or change signal distortion. The central controller sends data out via a communication system 130 (shown in FIG. 14) to local controller(s) to mitigate or reduce the signal distortion at specific locations on the power system. Several methods at the local control may be implemented for Signal Distortion Reduction and Control.

Another aspect of the invention in part addresses the need to observe power system conditions and make subtle changes to the output of an individual SMPP or group of SMPPs to mitigate or improve signal quality, or attempt to eliminate damaging power signals and signals that are a nuisance. Various methods may be employed within the scope of the present invention. The following are provided by way of example and without limitation:

1. Partial Phase Delay Mitigation to create constructive or deconstructive interference of signal distortion on power systems or routing through signal distortion through similar means
2. CT (current transformer) or PT (potential transformer) range limited and controlled, based on the switching period of the converter.
3. CT or PT range limited and controlled, based on period of observed reflected wave.
4. In line controllable power delay line between the power system and SMPP or wind turbine generator.
5. Software that digitally delays the current or voltage signals in the SMPP based on the switching period of the converter.
6. CT or PT that phase adjusts their own phase and the resulting input signal to constructively or deconstructive interfere with other harmonic sources.
7. Digital software that takes the signal from the CT or PT and phase adjusts their own phase and the resulting input signal to constructively or deconstructive interfere with other distortion sources.
8. An adjustable delay line in the power system to constructively or deconstructive interfere with other harmonic sources. The delay range of the delay line is based on the type of signal distortion observed and the mitigation needed.
9. A central or distributed observer that characterizes the collector system, and T&D system and monitors signal distortion. The central observer is programmable to watch for specific types of signal distortion and adjust the phase of one, some, or all of the SMPPs in the collector system to constructively or destructively interfere with the distortion at a given node or set of nodes on the power system.
10. A communication system that links the phase delay devices to the central observer and allows for control.
11. An observer on each SMPP that signals a distortion or harmonic is occurring that is or may be damaging to the equipment.
12. A controller that acquires data from all observers and is programmable to output a desired phase delay to each SMPP or delay line to improve signal quality.

Various algorithms are described herein for application within various embodiments of the present invention. Such algorithms are described by way of example, and without limitation. Not all of the algorithms are required to be run or be installed at the same time and this just one of many embodiments of the invention. For example, one of the observer and control algorithms is based on wave velocity and harmonic level of the current. The algorithm is programmed with the expected wave length of each harmonic and the line lengths of the T&D and collector system of the wind plant or other distributed generation systems. The algorithm monitors the phase of each harmonic and determines where they are traveling. This is accomplished by synchronizing all the clocks 33 (shown in FIG. 14) of the observers then watching the phase of each harmonic at each observer. The next step is to reference a look up table or database that has line lengths and material properties to estimate wave velocity. This could also be accomplished by direct measurement of the wave velocity at a given frequency and that data place into a look up table. The next step is to compare the magnitude and phase of each harmonic(s) along with their time to determine where they are traveling to attempt to determine common source and load. Once determined, if the harmonic or signal distortion is above a threshold, one embodiment could be the central controller sends a signal to a local controller to adjust the phase of a PT 108 or CT 107 on one or more SMPPs 126 to attempt to change the magnitude and phase of the observed harmonic(s) or monitored signal Quality, as reflected in signal waveform 82 to either reroute it to a different source or load, or create general interference to improve signal quality, as reflected in ameliorated signal waveform 83 by reducing the distortion. Algorithm 30 takes data of the entire wind park or other distributed generation systems as well as over the entire power system when observing harmonics and signal distortion, and create a database to identify condition/cause, change, and effect of those changes. It uses information for control and mitigation of signal distortion on the power system.

Another embodiment of the observer and controls is based on no load voltage harmonic characterization and full load voltage harmonic characterization. This is performed by all observers on the collector system. They look at the power system harmonics during no load conditions. They then look at the voltage harmonics caused by current. The two are added to characterize the combination of the two. This data is then used to determine if there is a threat of potentially damaging distortion on the power system. This is performed by comparing no load voltage data to full load voltage data. It is known that the no load data is generated primarily by equipment outside of the wind park. The full load data is generated by equipment within the wind park or distributed generation system. If the observers find harmonics that are sympathetic and in phase at certain nodes it can adjust the phase of the SMPP to create interference and prevent traveling waves from adding up creating voltage spikes or other damaging forms of distortion.

Another embodiment of a control algorithm is reflected wave detection within a collector system and on a T&D system. Wind turbine transformers and station transformers are strong voltage sources and the fact that the observers are usually placed near these devices, it is not always possible to measure reflected waves. However, an algorithm is employed to infer that reflected waves are occurring on the collector system by following the losses on the collector system sub cycle by sub cycle. Generally, if a reflected wave occurs, the reactive power and the losses will change. By measuring the harmonics and power produced or consumed between observers a reflected wave can be inferred. The observer can then signal to a controller to change the phase of some of the harmonics in an attempt to stop the reflected waves.

In this respect, before providing further detailed description of the invention, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A. Central Controller

Central controller 10 (shown in FIG. 12) is preferably a digital computer or Programmable logic controller with memory and input and outputs to move data. The central controller typically has a user interface in the form a display and method to input data and down load programs and routines. One embodiment of the central controller can be a programmable logic controller with a display and user interface. Further the central controller has a storage device to store information sent to by other devices such a meters or other controllers in the system.

Figure 12:
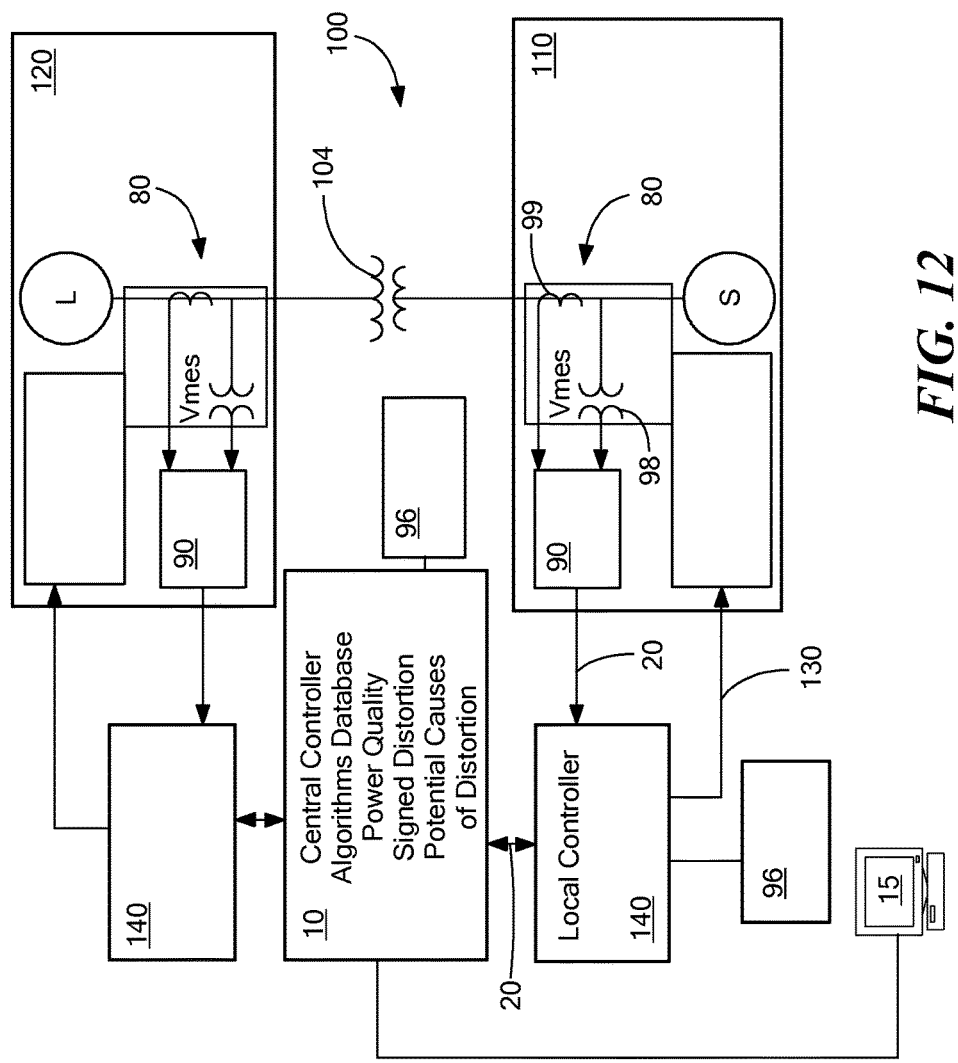
FIG. 12 is a flowchart illustrating overall operation in relation to the power system in accordance with embodiments of the present invention.
Figure 14:
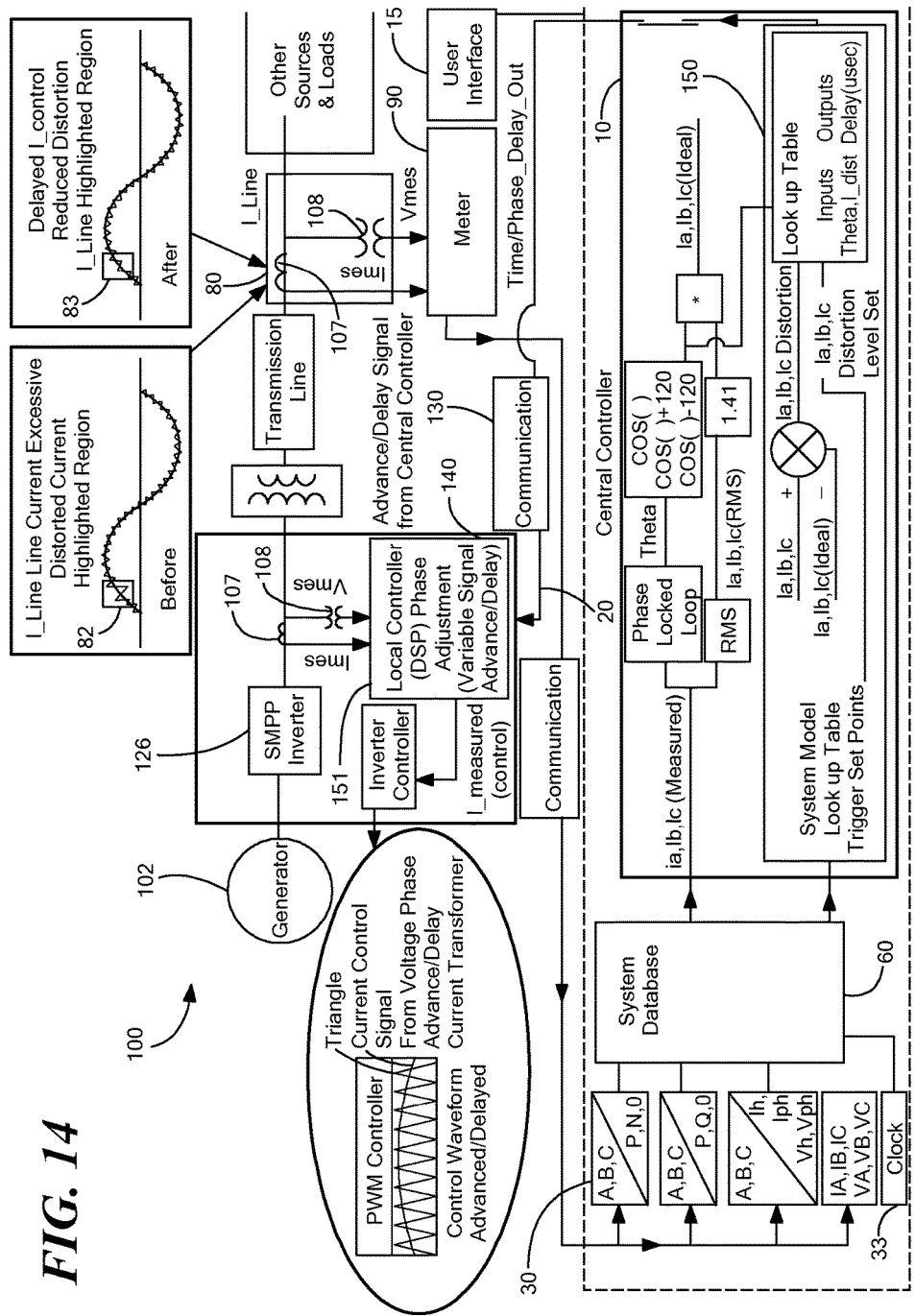
FIG. 14 is a schematic depiction of a waveform distortion mitigation system in accordance with embodiments of the present invention.

Referring to FIGS. 12 and 14, a power system is depicted schematically, as designated generally by numeral 100, incorporating embodiments in accordance with the present invention. Central controller 10 is typically a micro-processor-based digital computer with memory and input and outputs to move data 20. Central controller 10 has a user interface 15 in the form a display and executes a process to input data and download programs routines and algorithms. An embodiment of the central controller can be a programmable logic controller with a display and user interface. Furthermore, the central controller has a storage device 96 to store information sent to by other devices, such as, meters or other controllers, in the system. The central controller may include one or more micro-processors with memory and an operating system with programs, routines and algorithms. Central controller 10 also has a power supply that is preferably uninterruptable. Coupled to central controller 10 is a communication system that allows central controller 10 to communicate with other controllers and meters. Within the scope of the present invention, central controller 10 may be a programmable logic controller or a dedicated micro controller or any other type of microprocessor-based controller system.

B. Data

Bi-directional flow of information or data 20 is sent to and from the central controller 10 and between peripheral controllers is in the form of a digital signal or an analog signal which may be digitized. The data represent measured quantities on the power system at specific points, such as factual information, especially information organized for analysis or used to reason or make decisions; usually in the form of numerical or other information represented in a form suitable for processing by computer.

Referring now to FIG. 1, computer data 20 refers to information processed or stored by a computer. Computer data may be in the form of numerical data, string(s) which represent headers and the type of data, software programs, or other types of data. The data may be processed by the computer's microprocessor and may be stored in files and or a database on the computer's hard disk. The data may be sent in packets or sent serially between devices. The data may be in the form of a string, or in the form of numerical numbers already organized to be received by the CPU with its significance already assigned. It can be in the form of a file with many forms of information in a packet of data.

C. Algorithms

Algorithms (30) that run on central controller (10) and local controllers (140) (shown in FIG. 12) make use of the fact that power system (100) uses rotating machines to produce or consume power and power transformers (104) to step up or down the voltage. These machines are a major part of the (100) power system. The computer (30) algorithms basically create a model of the rotating machine and its sequences (e.g., Forward, Backward, Negative, Positive, Zero, Alpha, Beta, Zero and Direct and Quadrature); basically an equipment power system model. These are the ideal models of the rotating machines. The (30) algorithm takes the rotating sequences and creates waveforms that match the ideal state. The (30) algorithm then subtracts the ideal rotating sequences from the measured. What is left are the harmonics, resonant or switching sequences observed in the current or voltage waveforms of the power system.

Once the switching sequences are determined, an algorithm is created to determine if the current can be injected as a switch mode adjust signal at a given point to reduce distortion and improve signal quality. Also, another algorithm computes a phase change by the central controller 10 sending advance or retard signals to local controller 140. Other methods may include change in switching frequency, change is switching topology or added or subtracted signal asymmetry is needed that to improve power quality or reduce signal distortion.

The algorithms 30 employed in modeling power transmission system 100 and in responding to detected waveform distortions are made up of various transforms including rotational transforms and inverse rotational transforms that use the fact that the power system transfer of power is primarily based on rotating machines. The algorithms decompose the rotational aspects or the power system and what are left other sequences such as, harmonic, non-harmonic and switching sequences. Time, location, and duration are also logged so that the event is assigned a location place and time on the power system. One of the important algorithms is rotational decomposition where a rotational transform is split from the other signals and sequences in the power system. The purpose of the algorithms is to perform Event Classification (Harmonic, Resonant, Switching, etc.).

Various algorithms may be employed for rotational transforms and the inverse rotational transforms, within the scope of the present invention, such as Clark, Park, positive, negative, forward, backward, and associated zero sequences, for example. The transforms are used to decompose the signals on the power system and break them down into the rotational and non-rotational components. Time identification, location identification and duration identification algorithms are also used. The zero sequence is considered a rotational sequence. For the park transform a signal that emulates the angle of the machine may be used instead of the actual angle.

Rotation Decomposition is defined as separating the rotating aspects of equipment on the power system from the non-rotating aspects on the power system. On the power system there is equipment which rotates and equipment emulates rotation. The rotational components are evaluated by algorithms and data within a database and compared to machine models in another database and are compared for normal or desired operation. If a rotating component or component that emulates rotation is too far out of specification, a comparison algorithm logs the event. Depending on the design a signal goes to a remote controller to adjust or shut down the operation of the rotating machine or equipment that emulates a rotating machine. Also a signal can go to a display that alerts an operator that there is a mis-operation. Next another algorithm operates and assigns each rotation entity a source or load value.

When an algorithm determines signals to be non-rotational they are logged into database as well as the rotational. Then another algorithm separates them into switching sequences, harmonic sequences, non-harmonic sequences, resonant sequences and DC. The algorithm then uses the location and time of each event and compares them to models of the components on the power system and assigns them source and load values.

Since, by definition, a circuit element has a input and an output, it is considered and realized by the inventor that power in is power out. Power in is from the source and power out in the load. When separating the values out into components on a frequency basis and applying superposition a circuit element has a beginning and an end and the power depending on frequency can flow both directions at the same time or duration of time. However, the net or "sum" flow of all of the power flows at each frequency sum up to flow in one direction.

If needed an algorithm uses potential and flow to come up with power flows at specific frequencies within the network. Depending on the amount of monitored points in the network power is tracked on a frequency basis to attempt to identify the source and loads at their location or within a certain area of the network.

D. Power Quality

Power Quality is described as a set of limits which are primarily electric in nature and the limits are set to minimizes losses and maximize equipment life. Power quality is not necessarily limited to electrical characteristics. For example, torque is primarily a mechanical characteristic, the intent is to keep in nearly constant or when it changes it is controlled. Power quality is a set of limits of electrical properties that allows electrical systems to function in an intended manner without significance loss of performance or life also it is based on a model of the power system and desired operational needs by the local stake holders. This includes published Power Quality Standard (s) but with respect to this invention, and more importantly, standards agreed to by the operators of the entire power system 100. The power quality is placed into a Power Quality Standard Database (Dependent on desired objective). The desired objectives in the database are updated form time to time to reflect changes in the power system 100. Comparison algorithms of measured electrical values to power quality database compares measured values to a desired values and either alert operators to a problem or modify the operation of equipment or disable the equipment.

The power quality can be assessed by the power system operators in the form of standards and they compare the measured values with standards and modify the operation of the equipment. However, on a more dynamic basis algorithms which run on a computer can determine if a modification is needed by using the other algorithms in this invention to modify the signals and attempt to improve power quality.

E. Signal Distortion

Signal Distortion is the breaking away from the ideal sinusoidal AC waveform in voltage or current as measured on the power system and the desired displacement from other AC waveforms.

The meters send data to the controllers (Central or Local) for evaluation. The digital data that makes up the signal is compared to a template of desired data or values; a comparison algorithm to determine variance from desired is used to determine and characterize the signal distortion. In order to characterize the signal distortion the signals are broken down into various forms by comparing them to a Rotational Template that is generated by following the waveforms on the polyphase power system. Also a Switching Template is created by subtracting the rotating sequences from the measured values on the Power System and digitally filtering and using Fourier Transforms or similar transformation techniques including wavelets for identifying multiple switching sequences and switching events observed on the Power System. The transforms will also identify the load and source on a frequency basis so the Signal Distortion had Load Source Identification. Last Signal distortion is characterized by identifying a Traveling Wave on the Power System and Reflected Waves on the Power System. These waves can be caused by just the physical properties of the passive elements or caused by control system interactions of the equipment such a switch mode power supplies systematically switching with other equipment to create what appears to be a traveling or reflected wave.

Signal distortion can be determined by a meter with the meter sending the data to the other controllers or the raw data in the form of voltage and current and the time of the sample sent to a controller where that controller processes the data.

F. Database

A database 60 (shown in FIG. 14) stores and archives data sent from the meters on the power system and also stores status data from the equipment on the power system. Furthermore the Algorithms and routines running on the central computer read and write to the database.

Each controller has in it files and memory that make up a database. Each database has one or more schema that assign significance to the data, and the data may be set up in a tables with indexes. There are owners of the data. The owners can be operators accessing the data through a display or various algorithms that process the data to determine actions which may be taken to modify the performance of the system or to come to conclusions and write those values in either a new database or update the existing one. Each database is updates and accessed through procedures and views.

There are many forms a database can take. Usually they exist on computer memory and are access through a program running on top of an operating system. They can exist in the meters, local and remote controllers as well as the central controller.

G. Potential Causes of Distortion

Potential causes of distortion are detected events on the power system that a primarily not planed rotational events. Such as but not limited to events that are not directly harmonically events such as switching events, resonant events that are resonate on the power system, sequence events, Inferred Torque Pulsations, over current, and voltage. This element primarily uses the signals on a power system to decompose the signals from the rotational signal and all other signals.

Depending upon the operating objectives of the power system, its operators and the equipment connected to it or affected by it (such as third part phone systems), there are many potential causes of Distortion. These potential causes of distortion are Non Rotational events, undesired rotational events, harmonic events non harmonic events switching event, resonant event, Sequence Event (i. E. Forward, Backward, Positive, Negative, Zero), constructive and destructive interference and Intermittent Source and Load Alignment where the source and loads may have or have not aligned to distort the signal.

The potential causes of distortion can be measured through meters and through algorithms that process the data. The database can be programmed to identify the potential causes of distortion. The database can be updated to identify newly identified potential causes of distortion. The database either at the central controller can be used to identify equipment that is distorting the signal and either alert operators or modify its operation through a local controller.

H. Monitored Point

A monitored point is a point where the voltage and current along with other conditions are measured and digitized at a rate that is sub-cycle and at a relatively high frequency of greater than 1000 samples per second.

The monitored point (designated generally by the numeral 80 in FIG. 12, is made up of a connection point to monitor signal quality and possibly to modify signal quality and modify machine performance. The monitored point has meters (90), and a local controller (140) with a (60) database. There may be a inverter/converter (voltage or current source single or polyphase). The monitored point can be used to observe and send data or it can have a local controller that attempt to modify the voltage, current, or power at that point to improve or change the signal characteristics.

The monitored point can be just a meter at a specific place on the power system or it can be a local controller with an inverter converter to modify the voltage or current on a single phase of many phases. The monitored point will have current transducers and voltage transducers connected to the phase conductors of the power system (which may include DC, within the scope of the present invention).

I. Meters

"Meters," as used herein and in any appended claims, are devices that digitize the voltage, current, speed and condition of a motor or generator or other device connected to the power system.

Referring to FIG. 12, meters (90) receive a signal input (91) from the current transducers (99) and voltage transducers (98) at a monitored point (80). The meters use an analog-to-digital transducer (not shown) to digitize the signal and a microprocessor (not shown) to process the signal into meaningful data for the local (140) or central controllers (10) to use. The meter (90) usually writes the data (20) to memory (96) before data output occurs to the other controllers (140). Meter (90) typically includes an operating system to digitally process the signals along with algorithms and associated programming.

The meter usually has a microprocessor of some sort to digitally process the signal or filter the signal to create other values such as total harmonic distortion, Root mean square (RMS) values of the voltage and current, instantaneous values of voltage and current with a time stamp.

J. Power System

A "Power System," as the term is used herein and in any appended claims, is an assemblage of equipment and circuits for generating, transmitting, transforming, and distributing electric energy. Can be either DC or AC and one or many phases. It is to be understood that embodiments of the present invention may be employed with all, or part, of a power system.

Figure 10:
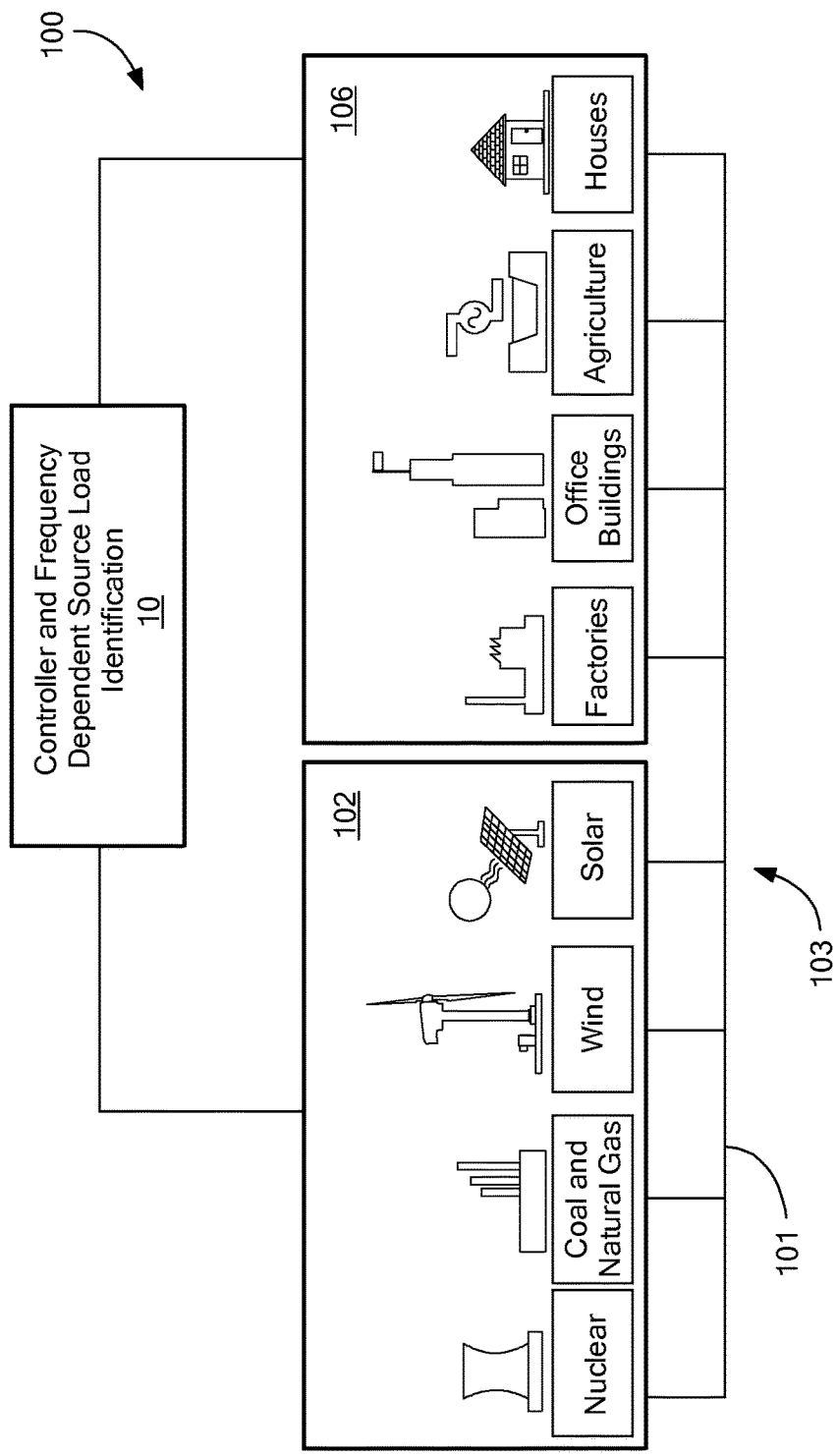
FIG. 10 is a flowchart illustrating the overall operation of an embodiment of the present invention that may be used to reduce distortion and improve power quality in part or the entire power system.
Figure 11:
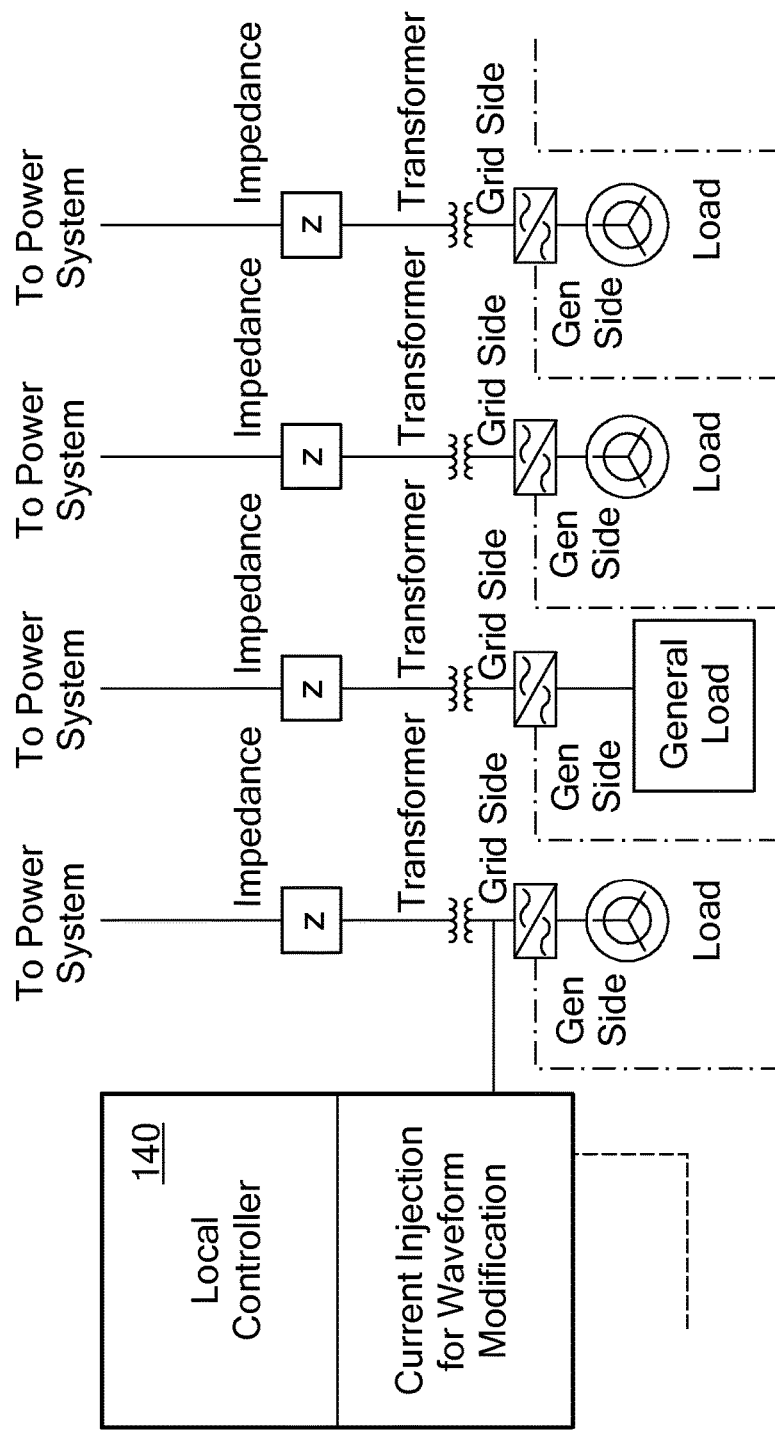
FIG. 11 is a flowchart illustrating a sub-operation in accordance with an embodiment of the present invention, used to improve power quality at the where the bulk power is consumed or at the load.

A power system (100) in the context of which embodiments of the present invention may be advantageously employed is depicted in FIG. 10, Generators (102) sends energy in the form of power to the consumers (106) through a distribution system (103). Power system 100 is made up of a power transmission system (101) which may be either DC, AC, or a combination thereof. The power typically goes through a transformation either in voltage, current or frequency as it passes through the transmission system from the generators to the loads for consumption. Usually, in order to get the power from the generator to the end loads, the power goes through a transformation via transformers; also, in some cases inversion or rectification. Further, power system (100) typically has protection devices on it. Also on a power system are frequency dependent loads and frequency dependent sources that may go with or against the bulk power flow.

The design objective of transmission networks to transport the energy is to do it as efficiently as feasible as possible, while at the same time taking into account economic factors, network safety and redundancy. These networks use components such as power lines, cables, circuit breakers, switches and transformers. The transmission network is usually administered on a regional basis by an entity such as a regional transmission organization or transmission system operator.

The operators and regional transmission organizations are increasingly challenged to facilitate the transmission of power as more and more volatile distributed generation is installed. Renewable resources coupled with switch power supplies or inverters/converters are increasing the types of signal distortion on the power system.

Power systems vary from frequency, voltage and current. There are 50 Hz power systems commonly found in Europe and 60 Hz power systems found in North America. Also, there are D.C. Power systems within A.C. Power systems. The generation found on power systems is coal, nuclear, hydro, wind, solar, etc. The loads found connected to the power system are pumps, motors, lights, computers, factories, office buildings etc.

However, usually generation and loads are given in terms of the bulk or net flow and not the flows that usually occur at higher frequencies. These loads and sources are intermittent and may flow in an opposite direction to the net flow of power. These flows need to be considered. These load and source can be described as frequency dependent source and frequency dependent load.

K. Net Source Intermittent Load

The term "net source intermittent load," as used herein, refers to an element which delivers energy to components on the power system but consumes energy at various intervals or frequencies.

Figure 6:
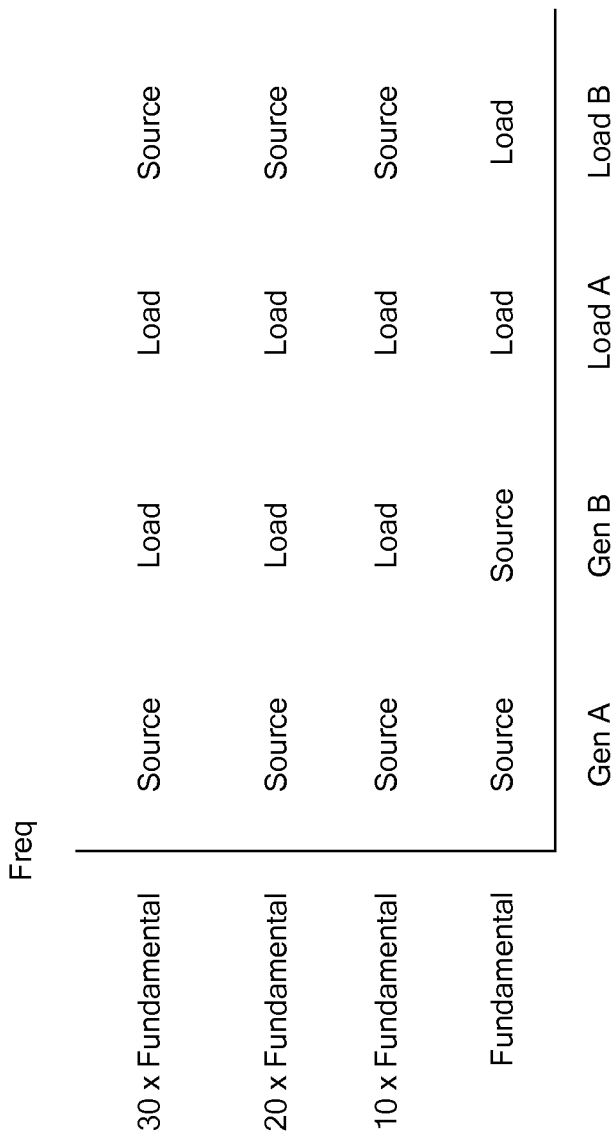
FIG. 6 provides a matrix showing that one distinct device may be both a source and load at a distinct frequencies.

Net source(s) on the power system deliver energy to the power system. However these net sources may become chronic intermittent loads due the way they are constructed. These intermittent loads could be observed through a cyclic or an intermittent change in power production. Another way to explain it is that if a power were passed through a low frequency filter, only the higher frequencies of power would pass through. When looking at it this way, the power could be seen as flowing to the generator instead of from it and the generator itself could be characterized as a load. However it would only be intermittent or periodic and less than the net or total energy delivered. With respect to a generating device the types of intermittent loads it may exhibit are random, cyclic, harmonic, resonant, periodic and switching. In this description, such generating devices are called net sources with intermittent load (NSIL) devices, or "Net Source Intermittent Load." That one distinct device may be both a source and load at a distinct frequencies is depicted in the exemplary matrix of FIG. 6.

Sources on the power system (100) may include Synchronous Generators, Induction Generators, DC generators, Inverters/Converters, Capacitors (reactive), and Inductors (reactive). The electrical sources on a power system, whether AC or DC, provide a net motive force which delivers power to the power system. Power moves or "flows" to the elements within power system (100) and finally dissipates out via a resistive element or resistor. Generally, circuit designers like to model a well-defined source and load on a circuit by using a generator for source and a resistor for load. A generator is a source by definition and a resistor is by definition a dissipative element or a load. However, there are other sources and loads in the system, what make them different is they consume as well as deliver power for short periods of time(inter-cycle). They look like both a source and a load when considering their operation within intervals of their charge and discharge cycle.

Types of sources, within the context of the present invention, also include reactive power elements such as a capacitor or inductor, which can be considered either a cyclic or intermittent source or cyclic or intermittent load. To be clear, when considering them over a charge and discharge cycle their net power delivered or consumed by the power system 100 is zero. Also, when considering them within the charging and discharging cycle they can either look like a power source or a load. In this invention these are called Net Zero Reactive Load (NZRL), Net Zero Reactive Source (NZRS).

The switch mode sources on a power system may be a switching devices with reactive elements such as, capacitors and reactors connected to inverters/converters or switch mode power supplies. Inverters/converters that control a generators output are considered a source. However, these devices produce currents and voltages at higher frequencies than the fundamental frequency they are attempting to synthesize. At certain frequencies they produce voltage and current harmonics that are multiples of the switching frequency and could be in phase and out of phase with the generation equipment, consequently making the product of harmonic currents and voltages look like a load. With respect to sources these are called Switch-Mode Net Source Intermittent Load (SMNSIL). And the last type of intermittent load is an undefined intermittent load (UID).

So, summarizing what has been fully described above, the net sources and net loads hare combined with their intermittent counterpart. They are: NSIL, NZRL, NZRS, and SMNSIL. These net sources are defined for the purpose of enhanced classification of elements on power systems. Last, there is the undefined intermittent load that has not yet been characterized by the system.

The interconnection of the power sources of generation are varied and many. The design of the power sources vary from large AC generators such a synchronous generators at large nuclear power plants, to smaller induction machines on a wind turbine generator. Capacitor banks and inductors are use also connected to the power system and provide reactive power and each is a source of reactive power. Capacitors provide capacitive reactive power and Inductors provide inductive reactive power; generally, each consumes what the other produces. Due to the construction of these devices the store energy at release energy that is out of phase with the net flow of power. If one filter the lower frequencies on would find that the power generators can also act as loads.

L. Net Load Intermittent Source

A component that dissipates energy from the power system but delivers energy at various intervals or frequencies.

The electrical load on a power system weather AC or DC is a dissipative load where the power flows out of the circuit and changes form, for example the energy is dissipated turns into heat, or motion. Generally, circuit designers like to model a well defined load on a circuit by using resistors. A resistor is, by definition, a dissipative element in an electric circuit where the power flows out of the circuit. However, in systems with changing voltages and or currents capacitors and inductors may be considered loads as well, however, they do not dissipate their power out of the circuit and hold their energy to be delivered at some later point. Switch mode power supplies consume power for powering computers, lights, etc. Inverters and converters can be loads as well if they are powering loads in factories, plants, etc. However, switch mode power supplies and inverter/converts provide power to the 100 power system. The loads periodically may act as a intermittent source and deliver power to the power system this primarily due to reactive power elements (capacitors and inductors or any element that stores energy within the circuit to be delivered at a later point) may from time to time change from loads into sources.

In accordance with embodiments of the present invention, loads that intermittently deliver power back to the power system are called Net Loads Intermittent Source (NLIS) 120 (shown in FIG. 12). Generally intermittent sources occur for brief periods of time and deliver power back to the power system 100. For a Net Load to act as an intermittent source it needs to store energy and deliver it back to the system at a later point; inductors and capacitors are elements that can help the device achieve this. Another example of a (120) Net Load Intermittent Source is an (126) inverters/converter used to process power for large loads. The switch mode power supply is also a load but may become an intermittent source for a brief period of time. The switch mode power supplies and inverters/converter can be classified as switch mode net load intermittent source (SMNLIS). In bulk they are loads however during brief periods of time they are sources. Switch mode power supplies consume power for powering computers and lights. Inverters and converters can be loads if they are powering loads in factories, plants, etc.

Figure 4:
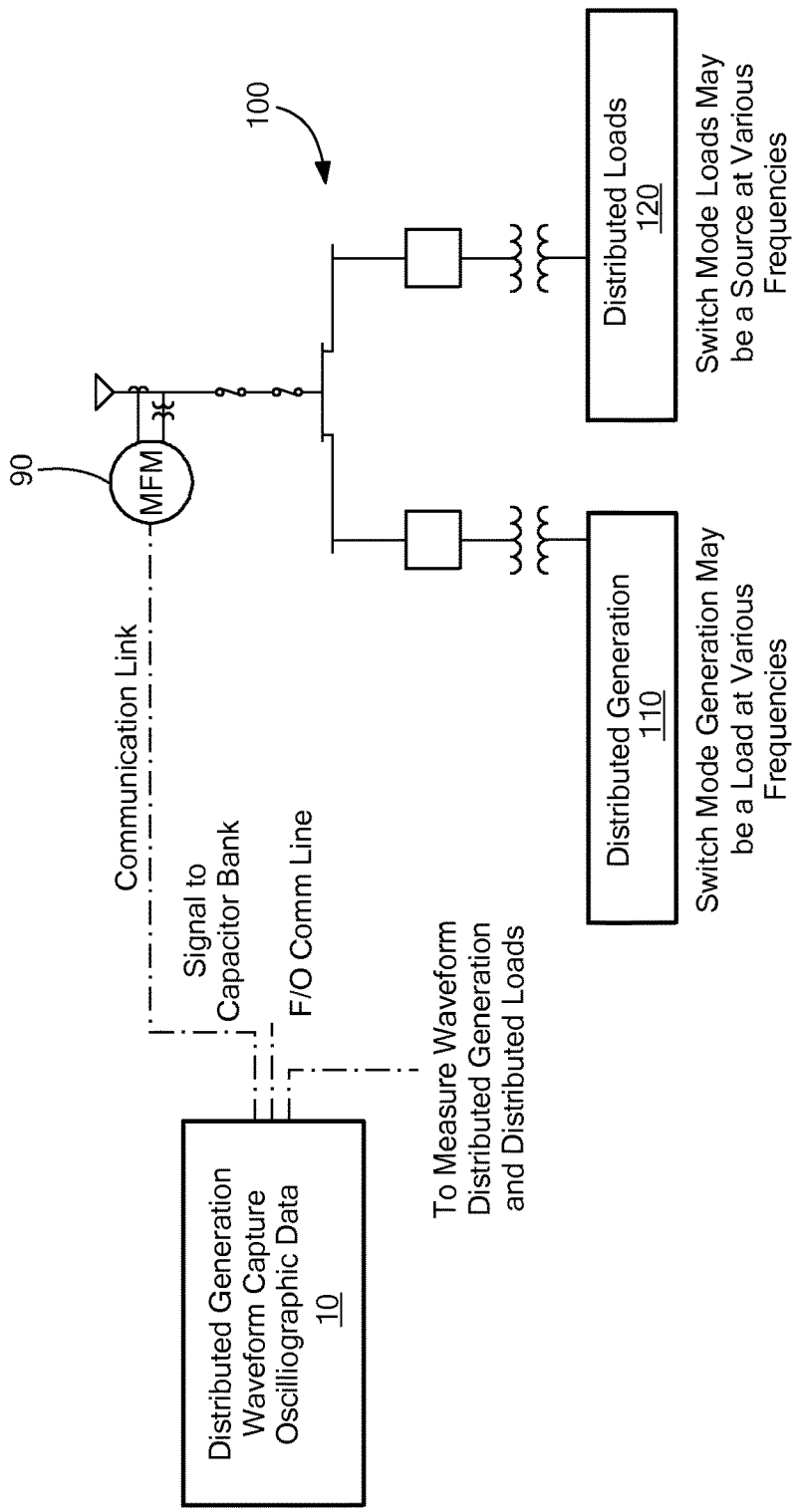
FIG. 4 is a flowchart illustrating a sub-operation of various embodiments of the present invention, depicting Distributed Generation and Loads and how they are interconnected on the power system and how a meter can acquire data from various loads and sources.
Figure 5:
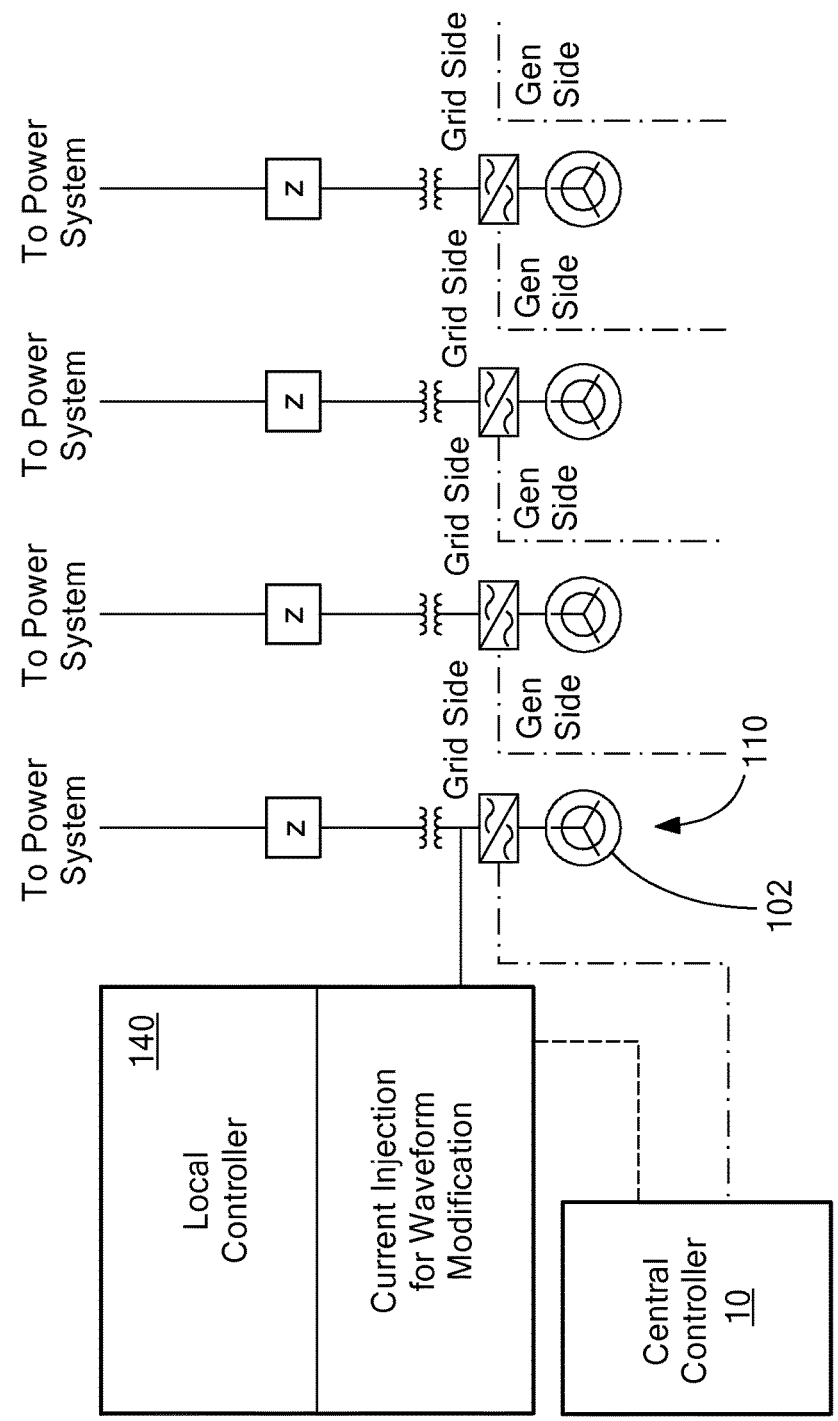
FIG. 5 is a flowchart illustrating a sub-operation of the present invention wherein current injection is used to actively change the distorted wave form. Current injection may also be used for zero voltage ride-through for sources and loads on the power system.

In further accordance with embodiments of the invention, net loads that deliver power intermittently or at various frequencies are Net Load Intermittent Source frequency-dependent sources 110 (shown in FIG. 4). Generally frequency dependent sources are net loads that are intermittent sources at higher frequencies. Their net power flow is a load and dissipative (energy flows out of the circuit and changes to another form). However, for shorter periods of time they act as a source and deliver energy back to the power system. For a frequency dependent load to turn into a source it needs to store energy and deliver it back to the system at a later point; Inductors and capacitors are elements that can achieve this function. Capacitor and inductors interconnected onto AC systems or DC devices such as switch mode power supplies may act as frequency dependent loads.

Figure 9:
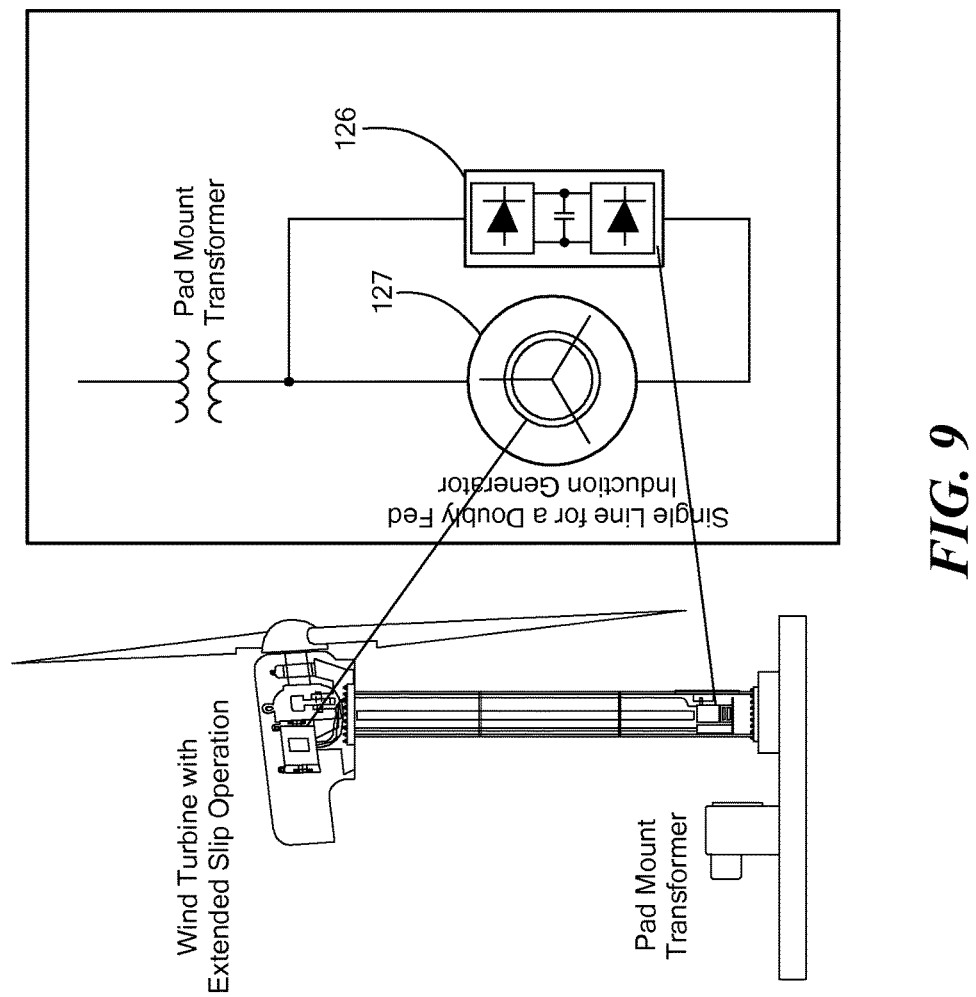
FIG. 9 is a flowchart illustrating a sub-operation in accordance with an embodiment of the present invention. Example of a wind turbine can be a generator of power but at different frequencies will be a load and a source.

Another example of a frequency dependent load is an inverter/converter 126 (shown in FIG. 9) used to process power on a wound rotor induction generator 127. Within its subsystem or on the rotor side the inverter/converter electrically connected the rotor acts as a load within a given set of rotational frequencies and acts as a source at others. The inverter converter on this system will either act as a bulk load or as a bulk source depending on conditions. At higher frequencies the capacitor bank is charging and discharging acting as a frequency dependent load for very short periods of time but cycling charging and discharging at or near a common switching frequency of the inverter/converter.

The primary sources on a power system are synchronous generators driven by a heat source that comes from either nuclear or coal. However, there now exist other types of sources and distributed generation. They are solar, wind, geothermal etc . . . . Also, capacitors and inductors may be considered a load if one is considering that the capacitor is consuming inductive reactive power and the inductor is consuming reactive power. Switch mode power supplies consume power for powering computers and lights however they also may act as a source and for brief short periods of time deliver energy back to the power system and act a frequency dependent source. Inverters and converters can be loads if they are powering loads in factories, plants, etc. At higher frequencies and due to the reactive power elements with the inverter/converter system loads can also act as frequency or intermittent sources.

An alternative way to explain this is that frequency dependent loads are intermittent loads. The name frequency depended sources implies that it occurs at a harmonic of the fundamental or some resonant condition. However, the term "frequency dependent loads also includes intermittent loads, cyclic or non-cyclic. This means that a switching event that occurs at random intervals can create "frequency-dependent loads".

M. Communication System

Collection of unidirectional or bidirectional exchange of messages, or information, as by signals through networks, transmission systems, relay stations, tributary stations, and data terminal equipment (DTE) usually capable of interconnection and interoperation to form an integrated whole. Meters 90 central controller 10 and local controllers 140 are interconnected by communication media (electrical, light, etc.) for the purpose of passing information or data between devices. The communication system 130 may also made up of modems, Network, Routers and switches which communicate with general protocols. However to ensure a nearly constant propagation delay for large distributed networks a serial communication system made up of Serial Network and dedicated Receivers and Transmitters may be constructed and used with serial protocols.

The communication system can be a simple serial communication system as well as more complex network systems the employ the use of information packets. Certain protocols are established and identified by name such as, Modbus Plus, TCP IP, Ethernet, etc.

N. Local Controller

Devices at the monitored point that either independently or based signals from other controllers or the central controller modify the signal at the monitored point. This can be affected by a separate unit or an integrated unit. The integrated unite would be a power processor or inverter/converter that changes the way it processes. Power based upon signals from other controllers or the central controller.

The local controller 140 may be made up of simple A/D converter with a Micro-Processor and memory and associated algorithms and routines to create a control system that acts as either a meter or with an optional Inverter/Converter with Inductive or Capacitive link to modify the voltage and or current on the local power system. Also, the local controller may have an optional protection system that signals and sends data to the central controller via the communication system indicating signal distortion and power quality measured on the power system or it can be a part of existing equipment with the same capability or capable of being programmed to create the same capability. If the equipment is installed separately there will be a local communication system that signal existing or third party equipment to adjust it behavior with respect to voltage and or current. There are many variations of the local controller. It can be a simple meter or a dedicated inverter/converter with DC link to store and deliver energy at times where it improves or changes the waveforms observed on the power system.

Also, the local controller can be integrated into existing inverters/converters on the power system via an algorithm and routines programmed into the existing devices or it is a separate device interconnected to the power system installed to improve power quality.

Switch mode power supplies may be used for loads and as power processors for regulating generation equipment. Meters may be used to measure the electrical quantities on the power systems to provide information to a microprocessor controller.

O. Signal Distortion Reduction and Control

Figure 3:
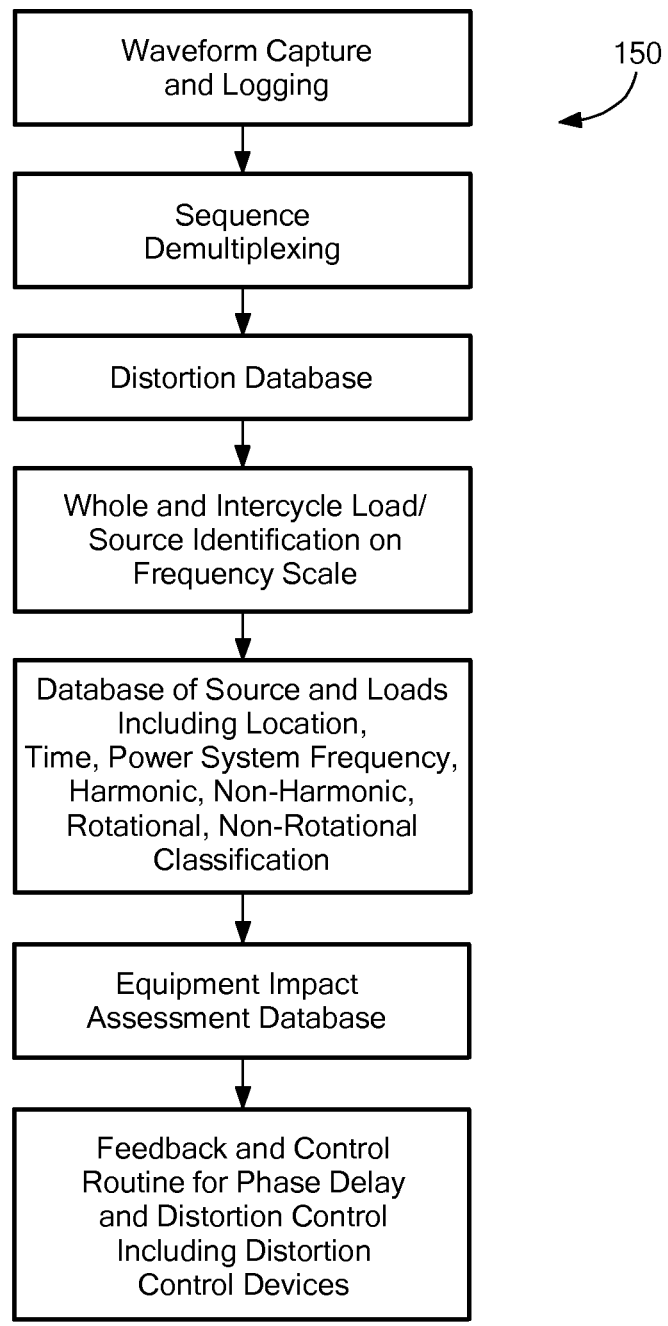
FIG. 3 is a flowchart illustrating the overall operation of an embodiment of the present invention that is useful for controlling any distortion on the power system.

A sequence of steps in accordance with an embodiment of the present invention is depicted in the flowchart of FIG. 3. Signal distortion is decomposed from the rotating sequence and identifies switch mode power supplies has switch mode power processors on the power system. Signal Distortion Reduction and Control, designated generally by numeral 150, is used to identify the types of distortion and rotating sequences observed on various locations of the Power System and to attempt to reduce the Signal Distortion. Returning to FIG. 14, Phase Adjustment Devices 151 are implemented through Current Transformers 107 and or Potential Transformers 108 that are phase adjustable or through digital logic that can either advance or retard the signals observed on the Power System 100. The Current Transformers 107 and Potential Transformers include Sensors on the Power System that measure the voltage and current. The Central Controller 10 and Local Controllers 140 using information from Algorithms send control signals to generation and consumption equipment to change their switching scheme or phase of their switching frequency. Also an embodiment could be to have the equipment implement programmed harmonic elimination if capable and could be implemented in a Switch Mode Adjust Signal. Furthermore, a Corrective Source or Corrective Load may be placed on the power system such a small switch mode power processor to inject current into the power system to change the signal distortion observed. If corrective action cannot be taken, a signal to the offending equipment is sent as a Shut Down signal.

Figure 7:
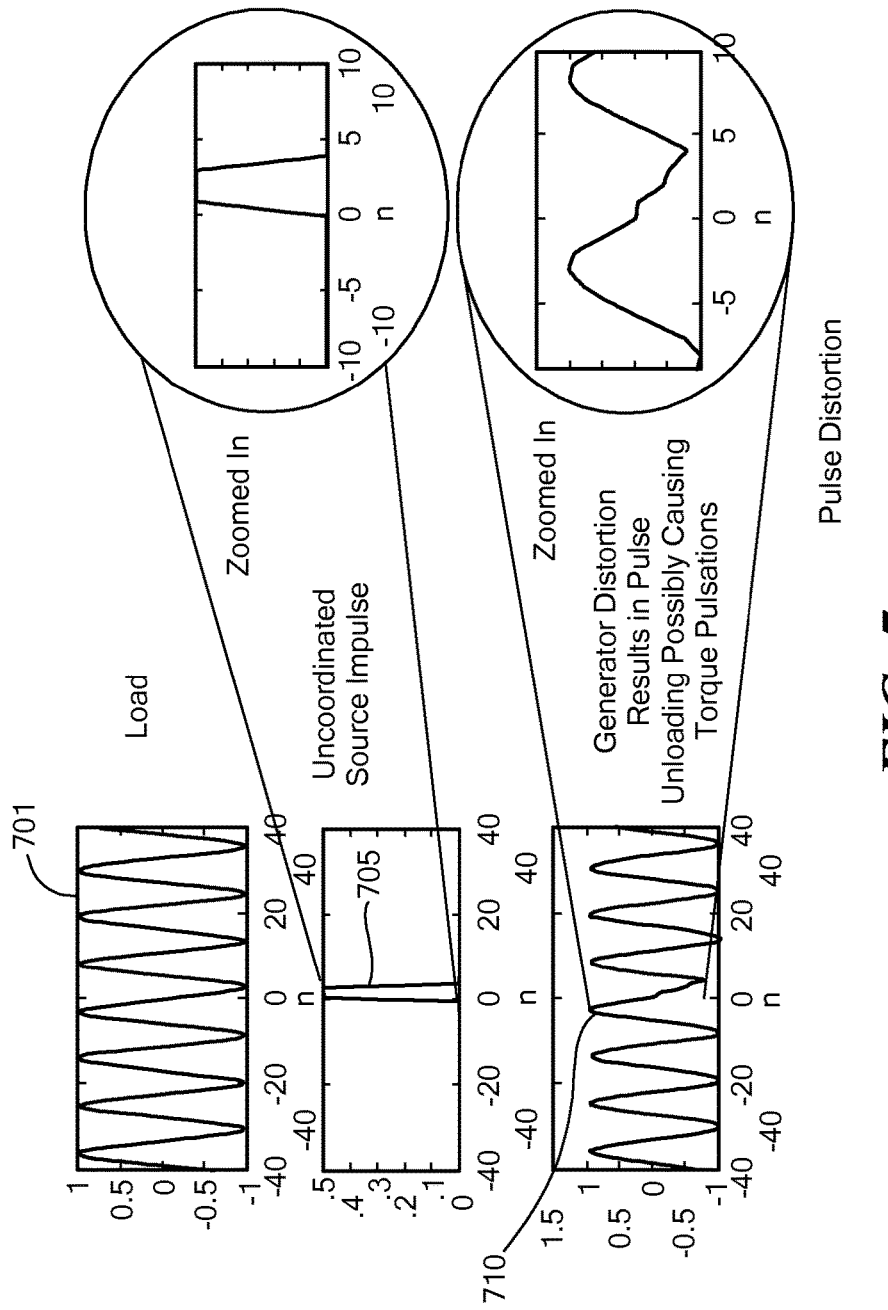
FIG. 7 is a is a flowchart illustrating a process in accordance with an embodiment of the present invention, whereby distortion in the wave form is detected, and impacted devices are identified.
Figure 8:
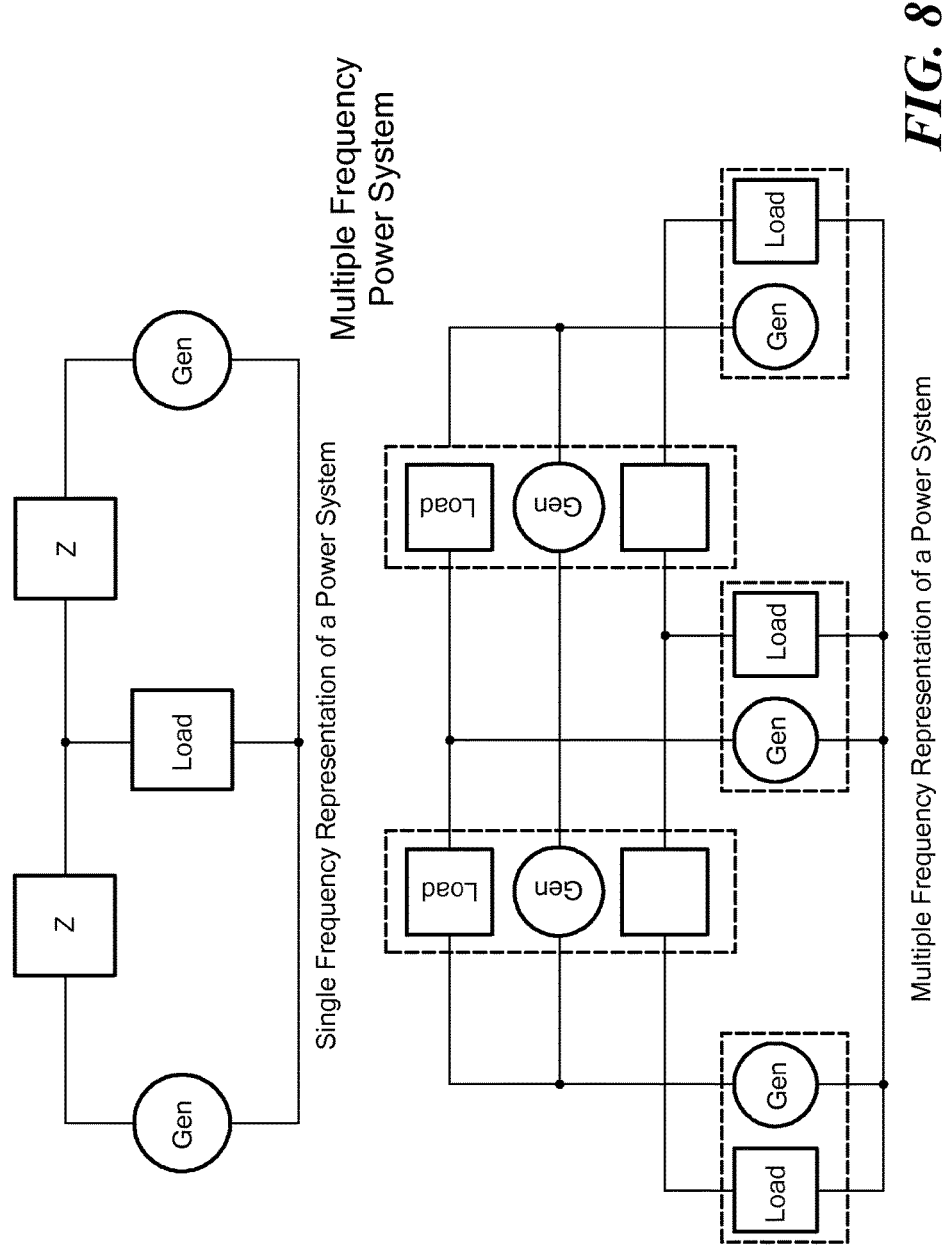
FIG. 8 is a flowchart illustrating a sub-operation in accordance with an embodiment of the present invention, for identifying a producer and a consumer of power as both a source and a load, in a frequency-dependent manner.

Control is distributed over the entire power system and is made up of one or more local controllers at the site of the generation equipment and a central controller that is monitoring conditions within the power system or local power system. This control uses most of the elements described, and delineates an approach to improving signal quality on the power system. The approach uses various algorithms to identify the types of signal distortion on the power system break them down into their types and apply the necessary corrective action, such as current injection, phase delay, or programmed harmonic elimination to improve signal quality. FIG. 7 shows an exemplary waveform where a load is consuming power sinusoidally 701, and an uncoordinated source impulse 705 appears on the system. Consequently, the generator is relieved of supplying that power. Distorted pulse 710 results, with a possible concomitant torques pulsation.

P. Connections of Main Elements and Sub-Elements of Invention

The central controller 10 is connected to the local controllers 140 via a communication system 130. The communication system sends data between the controllers. The data sent between controllers is measured by meters at desired monitored points and focuses on power quality and potential causes of signal distortion. The central controller as well as the local controllers place the data acquired into a database. The control system focuses on frequency dependent loads and frequency dependent sources and the location and time each occurs on the power system. The system then decomposes the rotational aspects as well as others to determine desired operation for undesired. Also the system looks for events that align to create short and seemingly random events that may damage components on the power system. The system then sends commands to the local controllers to change how they are processing power by having them either change their switching frequency, phase, switching topology. Further, reactive power can be changed and if a fault is on the system the local controller may act as a current injector to act as a buffer between the power system and other device for synchronous emulation and zero voltage fault ride through.

Q. Alternative Embodiments of Invention

To mitigate faults on the power system and or improve power quality the system may be implemented locally or over a distributed network or locally at one device. In the local sense the system may improve the power quality at one specific device and the local controller is the central controller and the communication system as well as the data is all local. The system may be expanded. For example, a wind plant may use such a system with the collector system at and the substation to improve power quality. Also, for an entire power system, embodiments of the present invention may be placed on the power system where it encompasses the transmission system and the distribution system to improve overall power quality.

R. Operation of Preferred Embodiment

Embodiments of the present invention sense distortion in the AC waveform. However distortion is not always well-defined on a power system. This invention clarifies types of distortion on the power system and signals that intended to be on the power system. In the restricted sense harmonics are multiples of the fundamental waveform, but sometimes used interchangeably with distortion and poor power quality. In this invention power quality is broken out and separated into several definitions. In the past the polyphase AC power systems the ideal wave form is an undistorted sinusoidal waveform of voltage and current and their products real power, apparent power, reactive power and instantaneous power. However, in the real world the waveforms are distorted by several different types of sources and loads. There are several methods of describing the distortion of the current and voltage in AC power systems. These methods include symmetrical components of the positive negative and zero sequence, the forward and backward, the alpha and beta, the direct and quadrature. These transformations are based on rotating electric machines. However there are other events not related to rotation that are designed to be on the power system, such as switching events due to switch mode power supplies and inverter/converters used to process power from distributed generation sources.

While inadequately acknowledged in present-day AC power-system design, distortion may arise due to switch mode power supplies, general switching and reactive power elements and periodic resonances. This type of distortion cannot be described in the rotating sequences above and may not necessarily be multiples of the fundamental wave(s); these switching sequences and resonant sequences are not adequately characterized by the rotating sequences. The switching of switch mode power supplies and switch mode based generation distort the AC waveforms and are not directly related to the rotating sequences commonly referred to in AC power system modeling.

The switching sequence is now defined, in accordance with the present invention, in response to both generally random and periodic currents or voltages that are not rotating sequences and not multiples of the fundamental wave(s). The harmonic sequences are defined as harmonics that may or may not be multiples of the fundamental and may or may not be related to the rotating sequences in the polyphase power system.

The occurrence of non-rotational sequences needs to be acknowledged, measured and controlled on the power system. The uncontrolled aspects of the nonrotational sequences have an increasingly negative impact on the AC polyphase power system. This is due to the interference and competition of the rotating sequences with the switching and resonance sequences. It is common to describe the AC Power systems in the positive, negative and zero sequence, and this description is based on rotation. With harmonics they can be broken down in to multiples of the fundamental and some of these multiples can create counter rotating torque pulsations in the AC machinery connect to the polyphase AC power system.

The switching sequences and other distortion may be decomposed from the ideal rotating sequence. For example, the rotating sequence may be composed or modeled using the direct and quadrature sequence (Park) and transformed in the two phase sequence and then transformed to the three phase sequence. This type of sequence does not include the other types of distortion such as a switching sequence.

The switching sequence may be placed into the Park sequence and transformed through to the three-phase sequence which is a consequence of SMPPS that use a park algorithm to control a SMPP generator or Motor drive. The switching sequence can be taken out of the positive negative and zero sequence and in by itself as a separate sequence. The point is if the switching sequence can be superimposed (superposition) onto a rotating sequence then a controller may be used to operating another switching device that will change the phase and magnitude of switching sequences on the polyphase AC power system for the purpose of improving the signal quality.

FIG. 1 is a flowchart illustrating one embodiment of the present invention. Single line of a Power System with distributed Generation and Load. Controller 10, in accordance with embodiments of the present invention, identifies distortion and uses either the same or a separate device to mitigate the adverse effects of the distortion. Distributed generation by a plurality of net sources 101 together comprising a distributed generating plant 110, where individual sources may be coupled via switch-mode converters 126 and inverters for power processing.

In accordance with further embodiments of the invention, the model and control system develop measures of distortions of the wave within the polyphase power system and characterize them by describing a tensor that has the dimensions of type, speed, direction location, time, common and uncommon source(s) and load(s). This information is the used for other controlling devices to create and or emulate other rotating, harmonic or switching sequences that change the original distortion. One method would be to reduce the overall distortion of the waves.

Certain embodiments of the present invention operate by measuring the voltage and current on the power system at a specific monitored point(s). Then, through the use of algorithms and routines, the locations of the source and load are identified at specific frequencies; depending upon whether the specific load or source is wanted or unwanted. That information is then employed to change the operation of the local controllers to attempt to improve the signal quality. The local controllers may be already-installed power processors with inverter/converter technology or separate devices used to actively change the signal.

The net sources and net loads exist on one but separate sides of the power system. However, the frequency dependent loads and sources may be on both sides of the power system, and sending fluctuating power against the net power flow, causing momentary loading and unloading of the larger rotational generators or motors and possibly creating unwanted torque pulsations or at higher frequencies stressing insulation or creating unwanted noise through magnetostriction of transformer, motor and generator cores.

The described embodiments of the invention are intended to be merely exemplary and numerous variations and modifications will be apparent to those skilled in the art. All such variations and modifications are intended to be within the scope of the present invention as defined in the appended claims.

We claim:

1. A method for governing harmonic content of a signal flowing through a component of a power transmission system including a plurality of switch-mode power processors, the method comprising:
  a. integrally monitoring at least one of current and voltage at a plurality of locations on the power transmission system with at least one current transformer or voltage transformer;
  b. integrally monitoring data from a plurality of nodes of the electric power system creating a database to identify at least one condition of distortion of voltage or current on the power transmission system;
  c. characterizing the integrally monitored of at least one of current and voltage relative to specified constraints;
  d. when at least one of the current and voltage is outside the threshold of a specified constraint at one of the plurality of locations, modifying at least one current or voltage by changing at least one time delay or phase
  e. characteristics of at least one frequency, of voltage or current of the integrally monitored voltage or current at least at one source, load, or transmission element on, or coupled to, the power transmission system;
  f. changing the integrally monitored voltage or current with at least a rotational transform (30) at least at one node with at least one adjustable phase current transformer or voltage transformer or with at least one switch mode power supply with adjustable phase current injection with at least one frequency.

2. A method in accordance with claim 1, wherein the power transmission system is a polyphase power transmission system.

3. A method in accordance with claim 1, wherein the power transmission system is a DC power transmission system.

4. A method in accordance with claim 1, for mitigating waveform distortion further comprising identifying a node within the power transmission system for applying a phase adjustment by at least one of a phase-adjustable current transformer or at least one phase-adjustable potential transformer.

5. A method in accordance with claim 4, wherein the identified waveform distortion is manifested as constructive interference or deconstructive interference as measured on to the power transmission system.

6. A method in accordance with claim 1, wherein modifying a waveform includes applying a phase adjustment of at least one frequency at an identified node by governing a switch mode power processor (SMPP) current injection into at least one particular node.

7. A method in accordance with claim 1, wherein the step of modifying includes shifting a phase of an uncoordinated source impulse(705) provided to the power transmission system by a specified source at an identified node.

8. A method in accordance with claim 1, wherein shifting the phase of a specified impulse includes advancing the phase of an uncoordinated source impulse (705) provided to the power transmission system.

9. A method in accordance with claim 7, wherein shifting the phase of a specified impulse includes retarding the phase of the uncoordinated source impulse (705) provided to the power transmission system.

10. A method in accordance with claim 6, wherein applying a solution at the identified node includes applying a phase adjustment of at least one of a phase-adjustable current transformer and a phase-adjustable potential transformer.

11. A method in accordance with claim 7, wherein shifting the phase of the uncoordinated source impulse (705) includes creating one of constructive and destructive interference of signal distortion by means of partial phase delay mitigation.

12. A method in accordance with claim 7, wherein shifting the phase of the uncoordinated source impulse (705) includes applying phase-limiting control of the current transformer and the potential transformer within a switching period of an SMPP.

13. A method in accordance with claim 7, wherein shifting the phase of the uncoordinated source impulse (705) includes applying phase-limiting control of at least one of a current transformer and a potential transformer based, at least in part, on a duration of a period of an observed reflected wave.

14. A method in accordance with claim 7, wherein shifting the phase of the uncoordinated source impulse (705) includes adjusting an in-line controllable power delay line between the power system and a SMPP.

15. A method in accordance with claim 7, wherein shifting the phase of the uncoordinated source impulse (705) includes adjusting an in-line controllable power delay line between the power transmission system and a wind turbine generator.

16. A method in accordance with claim 7, wherein shifting the phase of the uncoordinated source impulse (705) includes adjusting a variable impedance.

17. A method in accordance with claim 7, wherein shifting the phase of the uncoordinated source impulse (705) includes digitally delaying a current or a voltage signal in an SMPP on the basis of a switching period.

* * * * *